(12) United States Patent
Lindner et al.

(10) Patent No.: US 10,341,633 B2
(45) Date of Patent: Jul. 2, 2019

(54) SYSTEMS AND METHODS FOR CORRECTING ERRONEOUS DEPTH INFORMATION

(71) Applicant: QUALCOMM Incorporated, San Diego, CA (US)

(72) Inventors: Albrecht Johannes Lindner, La Jolla, CA (US); Kalin Mitkov Atanassov, San Diego, CA (US); Stephen Michael Verrall, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 14/948,195

(22) Filed: Nov. 20, 2015

(65) Prior Publication Data

US 2017/0148168 A1   May 25, 2017

(51) Int. Cl.
*G06T 5/00*   (2006.01)
*G06T 5/50*   (2006.01)
(Continued)

(52) U.S. Cl.
CPC .......... *H04N 13/128* (2018.05); *G06T 5/001* (2013.01); *G06T 5/50* (2013.01); *G06T 7/0002* (2013.01); *G06T 7/30* (2017.01); *G06T 7/593* (2017.01); *H04N 5/23258* (2013.01); *G06T 2207/10012* (2013.01); *G06T 2207/10028* (2013.01);
(Continued)

(58) Field of Classification Search
CPC .............. G06T 7/50–596; G06T 7/593; G06T 2207/10028; G06T 2207/10012; G06T 5/00; G06T 5/001; G06T 5/002; G06T 5/50; G06T 3/60; G06T 3/20; G06T 7/38; G06T 7/30; G06T 2207/20182; G06T 7/002;
(Continued)

(56) References Cited

U.S. PATENT DOCUMENTS

2007/0047834 A1   3/2007   Connell
2012/0182392 A1   7/2012   Kearns et al.
(Continued)

OTHER PUBLICATIONS

Lin, Bor-Shing, et al. "Temporal and Spatial Denoising of Depth Maps." Sensors 15.8 (2015): 18506-18525.*
(Continued)

*Primary Examiner* — Geoffrey E Summers
(74) *Attorney, Agent, or Firm* — Austin Rapp & Hardman, P.C.

(57) ABSTRACT

An electronic device for generating a corrected depth map is described. The electronic device includes a processor. The processor is configured to obtain a first depth map. The first depth map includes first depth information of a first portion of a scene sampled by the depth sensor at a first sampling. The processor is also configured to obtain a second depth map. The second depth map includes second depth information of a second portion of the scene sampled by the depth sensor at a second sampling. The processor is additionally configured to obtain displacement information indicative of a displacement of the depth sensor between the first sampling and the second sampling. The processor is also configured to generate a corrected depth map by correcting erroneous depth information based on the first depth information, the second depth information, and the displacement information.

18 Claims, 10 Drawing Sheets

(51) Int. Cl.
| | | |
|---|---|---|
| *G06T 7/00* | (2017.01) | |
| *G06T 7/30* | (2017.01) | |
| *G06T 7/593* | (2017.01) | |
| *H04N 13/00* | (2018.01) | |
| *H04N 5/232* | (2006.01) | |
| *H04N 13/128* | (2018.01) | |

(52) U.S. Cl.
CPC .............. *G06T 2207/20182* (2013.01); *H04N 2013/0081* (2013.01)

(58) Field of Classification Search
CPC ......... H04N 2013/0081; H04N 13/128; H04N 13/22; H04N 5/23258
USPC .................................. 382/154, 254, 275, 294
See application file for complete search history.

(56) References Cited

U.S. PATENT DOCUMENTS

| | | | |
|---|---|---|---|
| 2013/0177236 A1* | 7/2013 | Kim .................... | G06K 9/00201 382/154 |
| 2013/0194392 A1 | 8/2013 | Qi et al. | |
| 2013/0208129 A1* | 8/2013 | Stenman ................. | G06T 5/002 348/207.1 |
| 2013/0215220 A1 | 8/2013 | Wang et al. | |
| 2013/0244782 A1 | 9/2013 | Newcombe et al. | |
| 2014/0240467 A1* | 8/2014 | Petyushko ......... | H04N 13/0022 348/47 |
| 2015/0178900 A1* | 6/2015 | Kim .......................... | G06T 5/50 382/154 |
| 2015/0187140 A1 | 7/2015 | Tseng et al. | |

OTHER PUBLICATIONS

Bellekens, Ben, et al. "A survey of rigid 3d pointcloud registration algorithms." Fourth International Conference on Ambient Computing, Applications, Services and Technologies. IARA, 2014.*
"Coordinate Mapping." Microsoft, Oct. 8, 2014, https://msdn.microsoft.com/en-us/library/dn785530.aspx. Accessed Apr. 28, 2017.*
Fernandes, Claudio Dos Santos, Erickson Rangel do Nascimento, and Mario Fernando Montenegro Campos. "Visual and Inertial Data Fusion for Globally Consistent Point Cloud Registration." Graphics, Patterns and Images (SIBGRAPI), 2013 26th SIBGRAPI-Conference on. IEEE, 2013.*
Qayyum, Usman, and Jonghyuk Kim. "Inertial-kinect fusion for outdoor 3d navigation." Australasian Conference on Robotics and Automation (ACRA). 2013.*
Qi, Y., "A Performance Analysis of Vision-Based Robot Localization System", Theses and Dissertations, 2013, Paper 1091, pp. 1-69.
International Search Report and Written Opinion—PCT/US2016/056250—ISA/EPO—dated Dec. 23, 2016.
Veerakumar T., et al.,"High Density Impulse Noise Removal Using Modified Switching Bilateral Filter," International Journal of Circuits, Systems and Signal Processing, Jan. 1, 2012 (Jan. 1, 2012), pp. 189-196, XP055328301, Retrieved from the Internet: URL:http://naun.org/main/NAUN/circuitssystemssignal/16-086.pdf [retrieved on Dec. 12, 2016] section II-C.
Zhang S., et al.,"A New Impulse Detector for Switching Median Filters," IEEE Signal Processing Letters, IEEE Service Center, Piscataway, NJ, US, Nov. 1, 2002 (Nov. 1, 2002), vol. 9(11), pp. 360-363, XP011428425, ISSN: 1070-9908, DOI: 10.1109/LSP.2002.805310.

* cited by examiner

| Depths (n-1) 984 | | | Depths (n) 986 | | | Depths (n+1) 988 | | |
|---|---|---|---|---|---|---|---|---|
| $d_{n-1,x-1,y-1}$ | $d_{n-1,x,y-1}$ | $d_{n-1,x+1,y-1}$ | $d_{n,x-1,y-1}$ | $d_{n,x,y-1}$ | $d_{n,x+1,y-1}$ | $d_{n+1,x-1,y-1}$ | $d_{n+1,x,y-1}$ | $d_{n+1,x+1,y-1}$ |
| $d_{n-1,x-1,y}$ | $d_{n-1,x,y}$ | $d_{n-1,x+1,y}$ | $d_{n,x-1,y}$ | $d_{n,x,y}$ | $d_{n,x+1,y}$ | $d_{n+1,x-1,y}$ | $d_{n+1,x,y}$ | $d_{n+1,x+1,y}$ |
| $d_{n-1,x-1,y+1}$ | $d_{n-1,x,y+1}$ | $d_{n-1,x+1,y+1}$ | $d_{n,x-1,y+1}$ | $d_{n,x,y+1}$ | $d_{n,x+1,y+1}$ | $d_{n+1,x-1,y+1}$ | $d_{n+1,x,y+1}$ | $d_{n+1,x+1,y+1}$ |

FIG. 9

SYSTEMS AND METHODS FOR CORRECTING ERRONEOUS DEPTH INFORMATION

FIELD OF DISCLOSURE

The present disclosure relates generally to electronic devices. More specifically, the present disclosure relates to systems and methods for correcting erroneous depth information.

BACKGROUND

In the last several decades, the use of electronic devices has become common. In particular, advances in technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Depth is a component of three dimensional (3D) space. For example, depth may be represented as a distance between two points in 3D space. Many difficulties arise in attempting to accurately measure depth with electronic devices in real world situations.

In particular, motion and measurement outages may corrupt depth measurements, resulting in inaccurate and/or useless depth measurements. As can be observed from this discussion, improving depth measurement may be beneficial.

SUMMARY

An electronic device for generating a corrected depth map is described. The electronic device includes a depth sensor. The electronic device also includes a motion sensor coupled to the depth sensor. The motion sensor is configured to determine motion information. The electronic device further includes a processor coupled to the depth sensor and to the motion sensor. The processor is configured to obtain a first depth map. The first depth map includes first depth information of a first portion of a scene sampled by the depth sensor at a first sampling. The processor is also configured to obtain a second depth map. The second depth map includes second depth information of a second portion of the scene sampled by the depth sensor at a second sampling. The processor is further configured to obtain, based on the motion information, displacement information indicative of a displacement of the depth sensor between the first sampling and the second sampling. The processor is additionally configured to generate a corrected depth map by correcting erroneous depth information based on the first depth information, the second depth information, and the displacement information.

The processor may be configured to transform the first depth map based on the displacement information to produce a transformed depth map. The processor may be configured to correct the erroneous depth information of the second depth map based on the transformed depth map.

The processor may be configured to replace the erroneous depth information with corresponding depth information of the transformed depth map. The processor may be configured to average non-erroneous depth information of the second depth map with corresponding non-erroneous depth information of the transformed depth map.

The processor may be configured to detect the erroneous depth information by comparing a depth of the second depth map with a depth of the transformed depth map. The processor may be configured to determine whether the depth of the second depth map is more than a threshold amount from the depth of the transformed depth map. The processor may be configured to detect the erroneous depth information based on a spatio-temporal average between at least two depths of the transformed depth map and at least two depths of the second depth map.

The processor may be configured to project one or more points on a depth sensor plane to world coordinates to produce one or more world coordinate points. The processor may also be configured to rotate the one or more world coordinate points. The processor may further be configured to translate the one or more world coordinate points. The processor may additionally be configured to re-project the one or more world coordinate points to produce the transformed depth map.

The processor may be configured to detect the erroneous depth information based on a spatial average of two or more depths in the second depth map. The erroneous depth information may include depth sensor outages.

A method for generating a corrected depth map by an electronic device is also described. The method includes obtaining a first depth map. The first depth map includes first depth information of a first portion of a scene sampled by a depth sensor at a first sampling. The method also includes obtaining a second depth map. The second depth map includes second depth information of a second portion of the scene sampled by the depth sensor at a second sampling. The method further includes obtaining displacement information indicative of a displacement of the depth sensor between the first sampling and the second sampling. The method additionally includes generating a corrected depth map by correcting erroneous depth information based on the first depth information, the second depth information, and the displacement information.

An apparatus for generating a corrected depth map is also described. The apparatus includes means for obtaining a first depth map. The first depth map includes first depth information of a first portion of a scene sampled by a depth sensor at a first sampling. The apparatus also includes means for obtaining a second depth map. The second depth map includes second depth information of a second portion of the scene sampled by the depth sensor at a second sampling. The apparatus further includes means for obtaining displacement information indicative of a displacement of the depth sensor between the first sampling and the second sampling. The apparatus additionally includes means for generating a corrected depth map by correcting erroneous depth information based on the first depth information, the second depth information, and the displacement information.

A computer-program product for generating a corrected depth map is also described. The computer-program product includes a non-transitory tangible computer-readable medium with instructions. The instructions include code for causing an electronic device to obtain a first depth map. The first depth map includes first depth information of a first portion of a scene sampled by a depth sensor at a first sampling. The instructions also include code for causing the electronic device to obtain a second depth map. The second depth map includes second depth information of a second portion of the scene sampled by the depth sensor at a second sampling. The instructions further include code for causing the electronic device to obtain displacement information indicative of a displacement of the depth sensor between the first sampling and the second sampling. The instructions additionally include code for causing the electronic device to generate a corrected depth map by correcting erroneous depth information based on the first depth information, the second depth information, and the displacement information.

BRIEF DESCRIPTION OF THE DRAWINGS

FIG. 9 is a diagram illustrating examples of depths; and

DETAILED DESCRIPTION

Figure 1:
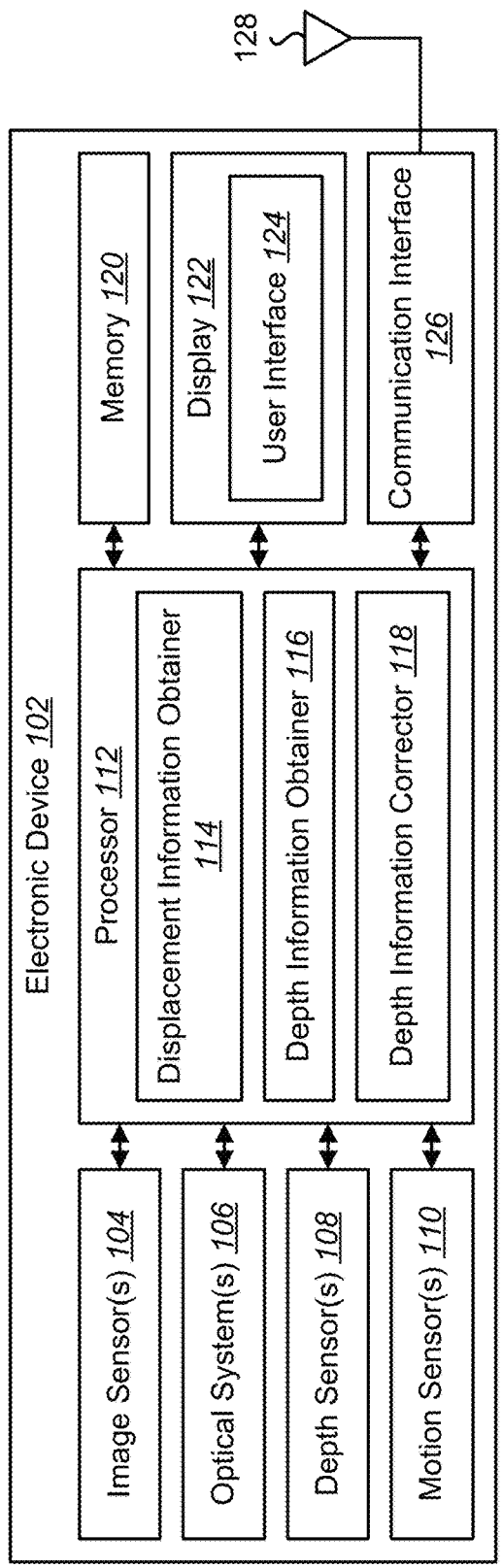
FIG. 1 is a block diagram illustrating one example of an electronic device in which systems and methods for correcting erroneous depth information may be implemented.

The systems and methods disclosed herein may provide approaches for correcting erroneous depth information. For example, the systems and methods disclosed herein may provide approaches for temporal filtering of depth maps from an unsteady electronic device using a motion sensor (e.g., accelerometer, etc.). Depth sensors may experience outages. An outage may occur when the depth sensor produces erroneous depth information. For example, a depth sensor may produce one or more incorrect depth measurements that do not accurately represent the depth (e.g., distance) between the depth sensor and an object. For instance, an outage may be an erroneous depth detection where the real depth is a value (e.g., x), but the depth sensor provides another value (e.g., y) and/or an outage may be complete failure to detect anything.

Outages (e.g., errors in depth maps) may depend on the technology used. In active approaches, a device itself may illuminate the scene with a light pattern (e.g., an infrared light pattern). For active approaches, dark surfaces that reflect little light may be prone to errors because the signal to noise ratio may be too low. Surfaces that are not orthogonal to the device (e.g., depth sensor), but that are tilted away may also be prone to errors. Other technologies (e.g., passive stereoscopic) may tend to have errors in flat and/or homogeneous areas and/or areas with repetitive patterns.

A depth sensor may capture depth information (and/or information for determining depth information). In some configurations, the depth information may include a set of depth measurements (e.g., distances, depths, depth values, etc.). For example, a depth sensor may sample a scene within a detection field to produce the set of depth measurements. The set of depth measurements may be a depth map. Depth maps often are low resolution and have outages (e.g., holes). Moreover, outage noise may remain from frame-to-frame when a depth sensor is moved. Temporal filtering (e.g., merging information across frames) may improve quality. However, a simple averaging blurs edges when a depth sensor is unsteady (e.g., when the depth sensor is hand-held or mounted on a car).

The systems and methods disclosed herein may provide approaches for mitigating the problems described above. Movement of a depth sensor can be estimated with a motion sensor (e.g., accelerometer, gyro, inertial motion sensor, visual odometry sensor, etc.). For example, the translation and/or rotation of a depth sensor may be estimated (with 6 degrees of freedom (DOF), for instance). Measured sensor movement may be utilized to map the depth information from one frame to a subsequent (e.g., next) frame. In the context of depth maps, the systems and methods disclosed herein may reduce or remove unknown displacement (e.g., parallax), because points may be estimated (e.g., known) with their full 3D location.

Some of the benefits of the systems and methods described herein are given as follows. The systems and methods disclosed herein may improve the quality of depth maps (over typical depth maps, which are usually low resolution and contain outages). Some configurations of the systems and methods disclosed herein may not require additional hardware. For example, accelerometers are ubiquitous on smartphones. In accordance with the systems and methods disclosed herein, frame-to-frame mapping may be fully deterministic once depth sensor movement is known. Accordingly, there may be no need to estimate parallax. The computational cost may be low for implementing various configurations of the systems and methods disclosed herein.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for correcting erroneous depth information may be implemented. Examples of the electronic device 102 include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart appliances, healthcare equipment, gaming consoles, personal digital assistants (PDAs), set-top boxes, surveying devices, security devices, topographical surveyors, mapping devices, etc. The electronic device 102 may include one or more components or elements. One or more of the components or elements may be implemented in hardware (e.g., circuitry) or a combination of hardware and software (e.g., a processor with instructions).

In some configurations, the electronic device 102 may include a processor 112, a memory 120, a display 122, one or more image sensors 104, one or more optical systems 106, one or more depth sensors 108, one or more motion sensors 110 and/or a communication interface 126. The processor 112 may be coupled to (e.g., in electronic communication with) the memory 120, display 122, image sensor(s) 104, optical system(s) 106, depth sensor(s) 108, motion sensor(s) 110 and/or communication interface 126. It should be noted that one or more of the components and/or elements illustrated in FIG. 1 may be optional in some configurations. For example, the electronic device 102 may not include image sensor(s) 104, optical system(s) 106, a display 122 and/or a communication interface 126 in some configurations.

In some configurations, the electronic device 102 may perform one or more of the functions, procedures, methods, steps, etc., described in connection with one or more of FIGS. 2 and 4-7. Additionally or alternatively, the electronic device 102 may include one or more of the structures described in connection with one or more of FIGS. 4-7.

The communication interface 126 may enable the electronic device 102 to communicate with one or more other electronic devices. For example, the communication interface 126 may provide an interface for wired and/or wireless communications. In some configurations, the communication interface 126 may be coupled to one or more antennas 128 for transmitting and/or receiving radio frequency (RF) signals. Additionally or alternatively, the communication interface 126 may enable one or more kinds of wireline (e.g., Universal Serial Bus (USB), Ethernet, etc.) communication.

In some configurations, multiple communication interfaces 126 may be implemented and/or utilized. For example, one communication interface 126 may be a cellular (e.g., 3G, Long Term Evolution (LTE), CDMA, etc.) communication interface 126, another communication interface 126 may be an Ethernet interface, another communication interface 126 may be a universal serial bus (USB) interface, and yet another communication interface 126 may be a wireless local area network (WLAN) interface (e.g., Institute of Electrical and Electronics Engineers (IEEE) 802.11 interface). In some configurations, the communication interface 126 may send information (e.g., image information, depth information, depth map information, etc.) to and/or receive information from another device (e.g., a vehicle, a smart phone, a camera, a display, a remote server, etc.).

In some configurations, the electronic device 102 may obtain one or more images (e.g., digital images, image frames, video, etc.). For example, the electronic device 102 may include the image sensor(s) 104 and the optical system(s) 106 (e.g., lenses) that focus images of scene(s) and/or object(s) that are located within the field of view of the optical system 106 onto the image sensor 104. A camera (e.g., a visual spectrum camera) may include at least one image sensor and at least one optical system. In some configurations, the image sensor(s) 104 may capture the one or more images. The optical system(s) 106 may be coupled to and/or controlled by the processor 112. Additionally or alternatively, the electronic device 102 may request and/or receive the one or more images from another device (e.g., one or more external image sensor(s) coupled to the electronic device 102, a network server, traffic camera(s), drop camera(s), automobile camera(s), web camera(s), etc.). In some configurations, the electronic device 102 may request and/or receive the one or more images via the communication interface 126. For example, the electronic device 102 may or may not include camera(s) (e.g., image sensor(s) 104 and/or optical system(s) 106) and may receive images from one or more remote device(s). One or more of the images (e.g., image frames) may include one or more scene(s) and/or one or more object(s). The image(s) may be in the visible domain. For example, the image(s) may include data that represents one or more aspects of visible light (e.g., color space, color model, color, brightness, luminance, etc.).

In some configurations, the electronic device 102 may include an image data buffer (not shown). The image data buffer may buffer (e.g., store) image data from the image sensor 104. The buffered image data may be provided to the processor 112.

In some configurations, the electronic device 102 may include a camera software application and/or a display 122. When the camera application is running, images of objects that are located within the field of view of the optical system(s) 106 may be captured by the image sensor(s) 104. The images that are being captured by the image sensor(s) 104 may be presented on the display 122. In some configurations, these images may be displayed in rapid succession at a relatively high frame rate so that, at any given moment in time, the scene(s) and/or object(s) that are located within the field of view of the optical system 106 are presented on the display 122. The one or more images obtained by the electronic device 102 may be one or more video frames and/or one or more still images. In some configurations, the display 122 may present additional or alternative information. For example, the display 122 may present one or more regions of interest (e.g., bounding boxes) corresponding to one or more detected and/or tracked objects. Additionally or alternatively, the display 122 may present depth information (e.g., numbers representing one or more estimated distances to one or more objects (e.g., selected objects)).

The one or more depth sensors 108 may sense the depth of a scene. For example, the depth sensor(s) 108 may sample the depth of the scene (e.g., one or more objects and/or terrain) within a detection field. The detection field may be a range (e.g., horizontal range, vertical range and/or angular range relative to the depth sensor(s) 108) within which the depth sensor(s) 108 are capable of detecting depth. Examples of depth sensors 108 include infrared time-of-flight (ToF) camera(s), stereoscopic cameras (e.g., image sensor(s) 104 and/or optical system(s) 106), radar, lidar, interferometer, etc. The depth sensor(s) 108 may provide depth information (and/or other information from which depth information may be obtained) to the processor 112. The depth information and/or other information may indicate distance(s) between the depth sensor(s) 108 and the scene.

In some configurations, the depth sensor(s) 108 may be included in the electronic device 102. In other configurations, the depth sensor(s) 108 may be separate from and coupled to the electronic device 102. For example, the depth sensor(s) 108 may communicate with the electronic device 102 (via the communication interface 126, for example) to provide depth information (and/or information from which depth information may be obtained) to the processor 112. It should be noted that the image sensor(s) 104 and/or optical system(s) 106 (e.g., cameras) may be the depth sensor(s) 108 in some configurations.

The depth sensor(s) 108 may sense depth at multiple samplings. A sampling may be a time at which depth is sensed. For example, the depth sensor(s) 108 may sample depth information (and/or information from which depth information may be obtained) at a first sampling and at a second sampling. In some cases, the depth sensor(s) 108 (e.g., the electronic device 102) may have moved between samplings. It should be noted that as used herein, ordinal terms such as "first," "second," "third," etc., may not necessarily imply an order. For example, a "first sampling" may occur before, after, concurrently with (e.g., in overlapping time frames) or at the same time as a "second sampling."

The motion sensor(s) 110 may detect motion to determine motion information. The motion information may indicate the motion of the motion sensor(s) 110 and/or the depth sensor(s) 108. For instance, the motion sensor(s) 110 may detect the motion of the depth sensor(s) 108. Some examples of motion sensor(s) 110 include accelerometers, gyros, inertial motion sensors, visual odometry sensors, etc. The motion sensor(s) 110 may be coupled to the depth sensor(s) 108. For example, the motion sensor(s) 110 may be physically coupled to the depth sensor(s) 108 by virtue of being integrated into the same electronic device 102. Alternatively, the motion sensor(s) 110 may be separate from the electronic device 102 and physically coupled to depth sensor(s) 108 that are also separate from the electronic device 102. The motion sensor(s) 110 may detect motion in one or more directions. For example, the motion sensor(s) 110 may detect motion with six degrees of freedom (DoF): yaw, roll, pitch, forward/backward translation, side-to-side translation and up-and-down translation. The motion sensor(s) 110 may provide motion information to the processor 112.

The processor 112 may include and/or implement a displacement information obtainer 114. The motion information may be provided to the displacement information obtainer 114. The displacement information obtainer 114 may obtain (e.g., determine) displacement information based on the motion information. The displacement information may indicate a displacement of the depth sensor(s) 108. For example, the displacement information may indicate a displacement of the depth sensor(s) 108 between samplings (e.g., from sampling to sampling, over multiple samplings, etc.). For instance, the displacement information may indicate how (e.g., translation, rotation, etc.) and/or to what degree the depth sensor(s) 108 have moved from a first sampling to a second sampling. More generally, a displacement is a positional difference over time (e.g., from the first sampling to the second sampling) due to motion or movement. In some configurations, the displacement information obtainer 114 may operate in accordance with one or more of the approaches, functions, procedures, steps, and/or structures described in connection with one or more of FIGS. 2 and 4-7.

In some configurations, the motion information itself may be the displacement information. For example, the displacement information obtainer 114 may receive the raw motion information as displacement information. In other configurations, the displacement information obtainer 114 may perform one or more operations on the motion information to obtain the displacement information. For example, the displacement information obtainer 114 may filter (e.g., smooth) the motion information over time (e.g., between two or more samplings).

Additionally or alternatively, the displacement information obtainer 114 may perform one or more transformations (e.g., translations, rotations) based on the motion information to obtain the displacement information. For example, the depth sensor(s) 108 may be physically coupled to the motion sensor(s) 110 and may move relative to the motion sensor(s) 110. In some configurations, the depth sensor(s) 108 and the motion sensor(s) 110 may not be exactly collocated. For example, a motion sensor may be housed near the center of a smartphone, while a depth sensor may be housed near the top edge of the smartphone and off to one side. As a result, the motion information itself may not directly reflect the motion of the depth sensor 108 because the depth sensor 108 is located differently and may undergo motions that are different from those sensed by the motion sensor 110. Accordingly, the displacement information obtainer 114 may perform one or more transformations (e.g., rotations, translations, etc.) based on the motion information to obtain the displacement of the depth sensor(s) 108.

In some configurations, the displacement information obtainer 114 may request and/or receive displacement information and/or other information (e.g., measured information) for determining displacement information. For example, the displacement information obtainer 114 may request and/or receive displacement information (and/or other information for determining displacement information) from a remote device (e.g., external depth sensor(s), remote server, remote electronic device, etc.) via the communication interface 126.

The processor 112 may include and/or implement a depth information obtainer 116. The depth information obtainer 116 may obtain depth information. Depth information may indicate one or more distances to (e.g., depth measurements of, depths of, depth values of, etc.) one or more physical bodies (e.g., objects, terrain, structures, etc.) from the depth sensor(s) 108. For example, depth information may be one or more numerical indications of distance, in units of distance (e.g., feet, inches, yards, miles, meters, centimeters, kilometers, etc.). In some configurations, the depth information obtainer 116 may obtain depth information (and/or other information from which depth information may be determined) from the depth sensor(s) 108 (and/or image sensor(s) 104). The depth information may correspond to multiple samplings over time (e.g., a first sampling, a second sampling, etc.).

The depth information may include erroneous depth information. Erroneous depth information may be information that indicates an incorrect depth (e.g., distance). For example, erroneous depth information may be caused by outages in and/or incorrectly measured information by the depth sensor(s) 108 (and/or image sensor(s) 104). In some configurations, erroneous depth information may not include correctly measured depth of an undesirable object. For example, if an interfering object is reflected in the depth information (and/or in measured information (e.g., images, time-of-flight information, etc.), the depth information corresponding to the interfering object may not be erroneous depth information because the resulting depth information accurately reflects the presence of that object in the scene (and is not an error in measurement, for example).

In some configurations, the processor 112 (e.g., depth information obtainer 116) may detect erroneous depth information. For example, there may be different (e.g., two) types of errors that can occur at a given location (e.g., pixel). One type of error may be a wrong measurement and another type of error may be no measurement. For a wrong measurement, the depth information may include a value, but the value is incorrect (e.g., the depth value does not reflect the actual depth accurately). Wrong measurements may occur due to noise corrupting the estimation process.

In some configurations, the depth information obtainer 116 may detect wrong measurements by comparing the depth value with one or more neighborhood depth values because wrong measurements may typically be isolated. For example, if a depth value is more than a threshold amount away (e.g., more than a threshold amount, less than a threshold amount, etc.) from one or more neighboring depth values (e.g., an interpolation (e.g., average) of neighboring depth values), the depth information obtainer 116 may determine that the depth value is erroneous depth information. Additionally or alternatively, the depth information obtainer 116 may compare a depth value (corresponding to a pixel, for example) with one or more transformed (e.g., re-projected) depth values from neighboring frames (e.g., previous and/or subsequent frame(s)). In some configurations, the one or more transformed depth values may be interpolated (e.g., averaged). Accordingly, the depth information obtainer 116 may determine whether a depth value (e.g., one or more of the depth values in the depth information) is erroneous by determining whether the depth value is significantly different (e.g., greater than one or more difference thresholds) from one or more neighboring depth values and/or one or more transformed (e.g., re-projected) depth values from previous and/or subsequent frame(s). Using both criteria may yield a higher reliability as there is more data for comparison. More specific examples of detecting erroneous depth information are given in connection with FIG. 9 that may be implemented (in and/or by the processor 112 and/or depth information obtainer 116, for example) in accordance with the systems and methods disclosed herein.

Another type of error that may occur may be when there is no depth value (at a corresponding pixel, for example). For instance, the depth information (e.g., depth map) may include one or more locations for which there is no depth value. This may occur if a signal is too low and the estimation process (e.g., depth sensor(s) 108) classifies the depth value as unreliable. This case may not occur for all depth sensing technologies. For example, some depth sensor(s) 108 may be configured to indicate no depth value when the depth value is classified as unreliable. For example, a depth sensor 108 may paint a scene with an infrared (IR) light pattern that is retrieved and decoded with an infrared camera. If the IR content is too low (e.g., below a threshold, buried in the sensor noise, etc.), the depth sensor 108 may leave the depth value location blank and/or may provide no value. Accordingly, the depth information obtainer 116 may detect an outage by comparing a depth value with its (immediate spatial and/or re-projected) neighborhood and/or by checking if it has no value.

In some configurations, the depth information may be obtained (e.g., determined) based on multiple images (e.g., stereoscopic depth determination), motion information, and/or other depth sensing. In some approaches, one or more cameras (e.g., image sensor(s) 104 and/or optical system(s) 106) may be depth sensors 108 and/or may be utilized as depth sensors 108. In some configurations, for example, the depth information obtainer 116 may receive multiple images (from the image sensor(s) 104 and/or from remote image sensor(s)). The depth information obtainer 116 may triangulate one or more objects in the images (in overlapping areas of the images, for instance) to determine the depth information (e.g., distances, depths, depth values, depth measurements, etc.) between an image sensor and the one or more objects. For example, the 3D position of feature points (referenced in a first camera coordinate system) may be calculated from two (or more) calibrated cameras. Then, the depth information may be estimated through triangulation.

In some configurations, the depth information obtainer 116 may determine the depth information based on moving cameras (e.g., an approach referred to as structure from motion (SfM)). For example, depth may be estimated based on two or more image frames due to camera motion (e.g., the motion of the camera(s) relative to one or more objects in a scene). For instance, by observing the motion of an object over time (in images over time or frames, for instance), the depth information obtainer 116 may determine a distance between the image sensor (e.g., image sensor(s) 104 and/or remote image sensor(s)) and the object. The object points from two views may be matched and the relative camera motion may be estimated. Then, the depth information (e.g., distances) of the object may be estimated (e.g., generated) by triangulation.

In some configurations, the depth information obtainer 116 may obtain depth information by utilizing one or more additional or alternative depth sensing approaches. For example, the depth information obtainer 116 may receive information (e.g., measured information) from the depth sensor(s) 108 (and/or image sensor(s) 104) that may be utilized to determine one or more distances of a scene. Examples of other depth sensors include time-of-flight cameras (e.g., infrared time-of-flight cameras), interferometers, radar, lidar, sonic depth sensors, ultrasonic depth sensors, etc. One or more depth sensors 108 may be included within, may be coupled to, and/or may be in communication with the electronic device 102 in some configurations. The depth information obtainer 116 may estimate (e.g., compute) depth information based on the measured information from one or more depth sensors and/or may receive depth information from the one or more depth sensors. For example, the depth information obtainer 116 may receive time-of-flight information from a time-of-flight camera and may compute depth information based on the time-of-flight information.

Additionally or alternatively, the depth information obtainer 116 may request and/or receive depth information directly from the one or more depth sensors 108 (in configurations where the depth sensor(s) 108 directly provides depth information, for example). For instance, stereoscopic visual spectrum cameras (e.g., image sensors 104 and/or optical systems 106) and/or one or more depth sensors 108 may compute depth information (e.g., distances) based on measured information (e.g., images, time, time-of-flight, phase shift, Doppler shift, etc.). Accordingly, the depth information obtainer 116 may receive depth information directly from one or more visual spectrum cameras, one or more infrared time-of-flight cameras, interferometers, lidar, radar, sonic/ultrasonic depth sensors, etc.

In some configurations, a combination of approaches for obtaining depth information (e.g., multi-modal depth) may be implemented. For example, a combination of SfM, stereoscopic triangulation, and lidar may be implemented. Other combinations may be implemented. Utilizing multi-modal depth estimation may improve the quality of the depth information.

The depth information obtainer 116 may obtain (e.g., determine) depth maps. Depth maps may include depth information and/or may be determined based on the depth information. For example, a depth map may be a set of depth information (e.g., depth measurements, distances, etc.) over a range (e.g., horizontal range, vertical range and/or angular range relative to the depth sensor(s) 108) of a scene. Depth maps may include erroneous depth information (e.g., a mixture of erroneous and correct (non-erroneous) depth information). In some configurations, the depth information obtainer 116 may receive depth maps from the depth sensor(s) 108. For example, the depth sensor(s) 108 may directly provide depth information (e.g., distances) over the range of the scene.

Additionally or alternatively, the depth information obtainer 116 may obtain (e.g., determine) depth maps based on the depth information. For example, the depth sensor(s)

108 may provide measured information that may be used to determine depth information and/or depth maps. For instance, the measured information may include time-of-flight time measurements, image data, received (e.g., reflected) signal power, received (e.g., reflected) signal amplitude, Doppler shift, signal phase shift, etc. The depth information obtainer 116 may determine depth maps based on the measured information. For example, the depth information obtainer 116 may calculate a set of depth information (e.g., distances, depths, depth values, etc.) based on received (e.g., reflected) signal power, received (e.g., reflected) signal amplitude, Doppler shift, signal phase shift, stereoscopic image measurements (e.g., disparity between the same point in image data captured by two or more cameras), structure from motion (SfM), etc. In some configurations, a depth map may include a set of depth information (e.g., numerical distances, depths, etc.) and may not include other kinds of data (e.g., visual domain data, time domain data, frequency domain data, etc.). It should be noted that while depth information and/or a depth map may be determined based on visual domain data in some configurations, the depth information and/or depth map itself may not include visual domain data (e.g., image data).

Each of the depth maps may correspond to a sampling of a scene. For example, the depths sensor(s) 108 may sample information (e.g., measured information, depth information, etc.) from a scene at multiple samplings (as described above, for instance) to yield multiple depth maps at multiple samplings. Accordingly, the depth maps may be sampled by the depth sensor(s) 108 at multiple samplings. In other words, the depth sensor(s) 108 may sample a depth map by sampling the scene and producing the depth information corresponding to the sampling, which depth information may be utilized as the depth map or may be utilized to determine the depth map. It should be noted that depth sensor(s) 108 may sample portions of a scene. For example, a depth sensor may sample a first portion of a scene at a first sampling and may sample a second portion of the scene at a second sampling. For instance, a depth sensor may sample different portions of the scene at different samplings when the depth sensor is displaced between samplings. As described herein, depth maps may include depth information that is and/or is derived from measured information (e.g., samples) taken at samplings.

In some configurations, the depth information obtainer 116 may operate in accordance with one or more of the approaches, functions, procedures, steps, and/or structures described in connection with one or more of FIGS. 2 and 4-7. It should be noted that while depth information may be relative to the location of the depth sensor(s) in some configurations, the depth information may or may not be mapped (e.g., transformed) relative to another point in some configurations. For example, the electronic device 102 may map the depth information to be relative to an arbitrary point (e.g., the center of a vehicle, the center of a device, etc.).

The processor 112 may include and/or implement a depth information corrector 118. The depth information corrector 118 may correct erroneous depth information. For example, the depth information corrector 118 may correct erroneous depth information of a depth map (e.g., may reduce errors in the erroneous depth information of a depth map). Correcting the erroneous depth information may generate a corrected depth map. For instance, the depth information corrector 118 may correct erroneous depth information in one depth map of a scene based on another depth map of the scene and the displacement information.

In some configurations, the depth information corrector 118 may correct the erroneous depth information of a second depth map of a scene based on a first depth map of the scene and displacement information. For example, the first depth map of the scene may be sampled by the depth sensor(s) 108 (and/or image sensor(s) 104) at a first sampling and the second depth map may be sampled by the depth sensor(s) 108 (and/or image sensor(s) 104) at a second sampling. The displacement information may indicate a displacement of the depth sensor(s) 108 (and/or image sensor(s) 104) between the first sampling and the second sampling. Correcting erroneous depth information may not include modifying visual domain data (e.g., images, pixels, etc.) in some configurations. Additionally or alternatively, correcting erroneous depth information may not include averaging erroneous depth information with correct depth information in some configurations. Additionally or alternatively, correcting erroneous depth information may not include just interpolating correct depth information of the same frame over erroneous depth information in some configurations.

It should be noted that the terms "correcting," "correction," "correct," and/or other variations of the term "correct" may mean a reduction in error and/or improvement in quality. However, "correct" and variations thereof may not mean perfect, exact, or precise correction in some cases and/or configurations of the systems and methods disclosed herein.

The depth information corrector 118 may transform a depth map based on the displacement information to produce a transformed depth map. For instance, the depth information corrector 118 may transform a first depth map based on the displacement information to produce the transformed depth map to correct a second depth map. Alternatively, the depth information corrector 118 may transform a second depth map based on the displacement information to produce the transformed depth map to correct the first depth map. Examples of transforms that may be performed by the depth information corrector 118 may include translation, isotropic scale, anisotropic scale, similarity, affine, and/or projective transforms. Transforming the first depth map may alter the first depth map to yield a transformed depth map that is approximately aligned with the second depth map. For example, transforming the first depth map may take into account the displacement between the first sampling and the second sampling. One example of a transform is provided in connection with FIG. 8.

Correcting the depth map (e.g., second depth map or first depth map) may be based on the transformed depth map. For example, the depth information corrector 118 may replace the erroneous depth information (e.g., outages, holes, etc.) with corresponding depth information of the transformed depth map. For instance, one or more of the erroneous depths of the second depth map may be replaced with one or more corresponding depths of the transformed depth map. In another approach, one or more of the erroneous depths of the second depth map may be replaced with one or more interpolated depths that are based on one or more transformed depth maps. More specific examples of correcting erroneous depth information are given in connection with FIG. 9 that may be implemented (in and/or by the processor 112 and/or depth information corrector 118, for example) in accordance with the systems and methods disclosed herein.

The correction may be better than just interpolating pixels in the same frame or just averaging non-transformed frames. For example, if only the neighborhood is used, the erroneous depth may be filled in with, for example, an average value, which may tend to blur fine details. This can be improved by using a transformed depth map (e.g., a re-projection) from another frame with the corresponding location (e.g., pixel location). The transformed depth may be even more beneficial if the error (e.g., wrong measurement and/or outages) is larger than just a single location (e.g., pixel). The larger the patch to fill, the more difficult it may be to accurately correct the value based only on the neighborhood. Accordingly, it may be beneficial to transform (e.g., re-project) from one or more other frames that may have more accurate information.

In some configurations, correcting the depth maps may be performed for each neighboring pair of a sequence of depth maps. For example, a second depth map may be corrected based on a first depth map and a displacement between the first depth map (e.g., first sampling) and the second depth map (e.g., second sampling). A third depth map may then be corrected based on the second depth map (e.g., the corrected second depth map) and a displacement between the second depth map (e.g., second sampling) and the third depth map (e.g., third sampling). This procedure may be repeated for subsequent pairs of depth maps. In some approaches, corrected depths may be carried over to one or more next (e.g., subsequent and/or previous) frames. As can be observed, each subsequent depth map may contain fewer and fewer errors as erroneous depth information is corrected over time.

In some configurations, corrections may not be carried over to one or more (e.g., subsequent and/or previous) frames. For example, this may be a more robust approach, since the content (e.g., corrected content) of a frame may only depend on a directly preceding frame and not multiple (e.g., a set number or an infinite amount of) previous frames. However, it should be noted that carrying over corrections and not carrying over corrections may both offer advantages and disadvantages.

In some configurations, if processing is done offline, it may be possible to perform corrections based on one or next frames (in a backwards order, for instance). For example, a frame (e.g., view n) may be corrected based on a preceding frame (e.g., view n−1) and/or a subsequent frame (e.g., view n+1).

In some configurations, if both the first depth map and the second depth map include erroneous depth information (at the same position, for example), the erroneous depth information (e.g., outage, hole, etc.) may remain in the second depth map. Alternatively, the second depth map may be corrected based on another depth map (e.g., a depth map preceding the first depth map). For example, if the depth sensor 108 moves relatively slowly with respect to the scene, it is possible to match depth frames not only to the next frame but to the N next frames. Accordingly, the likelihood that the exact same error is present in all N frames may diminish very rapidly (based on the number of N frames, for example).

In some configurations, the electronic device 102 (e.g., processor 112) may average non-erroneous depth information of the second depth map with corresponding non-erroneous depth information of the transformed depth map. This may smooth the non-erroneous depth information between the depth maps.

The systems and methods disclosed herein may provide improved depth information (e.g., depth maps). For example, erroneous depth information in the depth maps may be reduced and/or eliminated as described above.

In some configurations, the depth maps may be applied in a vehicle. For example, the electronic device 102 may be or may be included in a vehicle. The depth maps may be utilized to indicate the distance between the vehicle and one or more objects (e.g., other vehicles, pedestrians, barriers, buildings, the road, obstructions, etc.) in a scene around the vehicle. In some configurations, the electronic device 102 may be or may be integrated into an Advanced Driver Assistance System (ADAS).

In some configurations, the depth maps may provide accurate dynamic depth information to a vehicle. For example, the vehicle (e.g., electronic device 102, processor 112, or a separate device in communication with the electronic device 102) may provide a visualization and/or messages based on the depth maps. For example, the vehicle may provide a surround view visualization that indicates distances to one or more objects.

More specifically, the vehicle may obtain image data (from the image sensor(s) 104 or other image sensors) and may produce a visualization of the scene surrounding the vehicle. One or more objects in the visualization may be indicated based on the depth maps. For example, the visualization may show a numerical distance to a parked car from the vehicle when parking (e.g., parallel parking) and/or a numerical distance to one or more objects (e.g., other vehicles) in the vicinity when driving. Additionally or alternatively, the vehicle (e.g., electronic device 102) may generate a 3D geometric model based on the depth information and map image data to the 3D geometric model to produce a 3D visualization. The visualization may be presented on a display (e.g., display 122) in the console, on the windshield, on a hand-held device (e.g., smartphone), and/or on a head-mounted display (e.g., virtual reality display, augmented reality display, Oculus Rift device, HoloLens device, etc.).

Additionally or alternatively, the vehicle may provide one or more messages (e.g., text, audio, visual, etc.) based on the depth maps. For example, the vehicle may output a warning sound (e.g., chime, beep, spoken warning, etc.) when the vehicle is less than a distance away from an object (in the direction of travel, for example). In another example, the vehicle may output a message indicating directions (e.g., where to park, where to turn, etc.) based on the depth maps.

Additionally or alternatively, the depth maps may provide accurate dynamic depth information to an autonomous (e.g., self-driving) vehicle, semi-autonomous (e.g., self-driving with user assist) vehicle, and/or driver-assisting vehicle in some configurations. For example, the vehicle (e.g., electronic device 102, processor 112, or a separate device in communication with the electronic device 102) may track a road and/or avoid collisions with objects (e.g., other vehicles, barriers, obstructions, etc.) based on the depth maps. For instance, the vehicle may steer away from another object when the depth map indicates that the object is within a certain distance. Additionally or alternatively, the vehicle may apply brakes and/or acceleration to avoid a collision with the object. Additionally or alternatively, the vehicle may track a road (e.g., stay within curbs or barriers, avoid driving off of the road, etc.) based on the depth maps. This may be applied in automatic navigation for self-driving vehicles (e.g., cars).

In some configurations, the depth maps may be utilized in image capture and/or reproduction. In one example, the depth maps may be used to model a scene. For example, the electronic device 102 (e.g., a camera, smartphone, surveying device, etc.) may create a 3D model of a scene based on the depth maps. Image data (from the image sensor(s) 104, for example) may be mapped to and/or rendered on the 3D model in some configurations. This may allow for 3D photography, 3D modeling, virtual reality, and/or augmented reality reproduction of a scene (e.g., for use in an Oculus Rift device, HoloLens device, etc.).

The memory 120 may store instructions and/or data. The processor 112 may access (e.g., read from and/or write to) the memory 120. Examples of instructions and/or data that may be stored by the memory 120 may include measured information, depth information, depth maps, image data, image visualization data, object data (e.g., location, size, shape, etc.), model data, displacement information obtainer 114 instructions, depth information obtainer 116 instructions, and/or depth information corrector 118 instructions, etc.

In some configurations, the electronic device 102 may present a user interface 124 on the display 122. For example, the user interface 124 may enable a user to interact with the electronic device 102. In some configurations, the user interface 124 may enable a user to indicate preferences (e.g., depth information display settings, image visualization settings, etc.) and/or to interact with the depth information and/or image visualization. For example, the user interface 124 may receive one or more commands for changing the image visualization (e.g., zooming in or out, rotating the image visualization, shifting the image visualization, changing image visualization shape, changing the image visualization viewpoint, etc.). Additionally or alternatively, the user interface 124 may receive an input (e.g., a tap) that indicates a selection of an object in the image visualization. In some configurations, the selected object may be tracked.

In some configurations, the display 122 may be a touchscreen that receives input from physical touch (by a finger, stylus or other tool, for example). For instance, the touchscreen may be an input interface that receives a touch input indicating user preference(s) and/or one or more modifications of electronic device 102 behavior. Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click indicating an input.

It should be noted that no user input may be necessary in some configurations. For example, the electronic device 102 may automatically correct erroneous depth information.

In some configurations, the electronic device 102 (e.g., processor 112) may optionally be coupled to, be part of (e.g., be integrated into), include and/or implement an advanced driver assistance system (ADAS). For example, the electronic device 102 may present depth information in a vehicle (on an in-dash display, a console display, a windshield projector, a heads-up display, optical head mounted display, etc.). This may assist the driver in situational awareness and/or collision avoidance.

The electronic device 102 (e.g., processor 112) may optionally be coupled to, be part of (e.g., be integrated into), include and/or implement one or more other kinds of devices. For example, the electronic device 102 may be implemented in a drone equipped with depth sensor(s) 108. The depth information may indicate depths between the drone and its surroundings. Accordingly, the depth information may be utilized for scene modeling, collision avoidance, 3D photography, etc. For instance, this may be applied in automatic navigation for drones. In another example, the electronic device 102 (e.g., processor 112) may be implemented in an action camera (including one or more image sensors and/or lenses). The depth information may be used to generate a virtual reality and/or augmented reality image of the action camera's surroundings.

Figure 2:
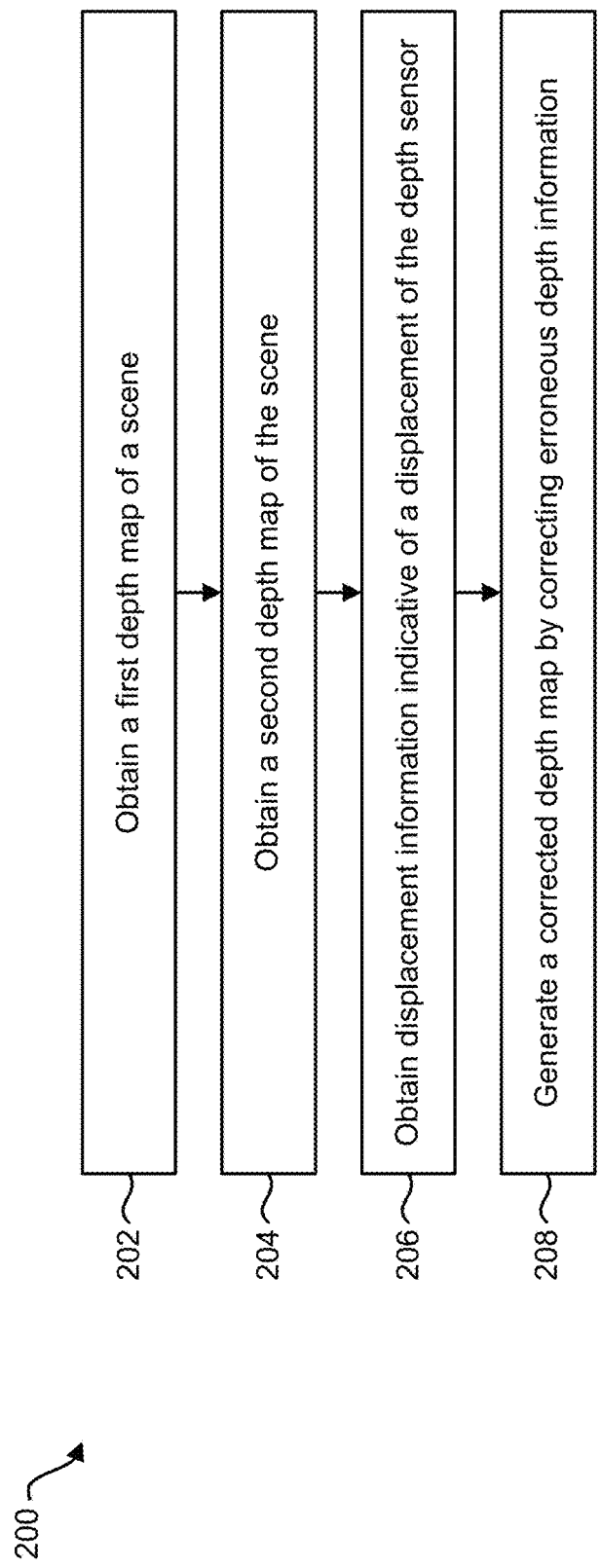
FIG. 2 is a flow diagram illustrating one configuration of a method for correcting erroneous depth information.

FIG. 2 is a flow diagram illustrating one configuration of a method 200 for correcting erroneous depth information. The method 200 may be performed by the electronic device 102 described herein, for example.

The electronic device 102 may obtain 202 a first depth map of a scene. This may be accomplished as described in connection with FIG. 1. For example, the electronic device 102 may obtain depth information and/or other information (e.g., measured information for obtaining depth information) from one or more depth sensors 108 at a first sampling. The first depth map may be determined based on the depth information. For example, the first depth map may be the depth information (e.g., all or a subset of the depth information) and/or may be based on the depth information (e.g., the first depth map may be a transformed version of the depth information). For instance, the electronic device 102 may obtain 202 a first depth map, where the first depth map includes first depth information of a first portion of a scene sampled by the depth sensors at the first sampling. Additionally or alternatively, the electronic device 102 may request and/or receive the first depth map from a remote depth sensor and/or from another device.

The electronic device 102 may obtain 204 a second depth map of the scene. This may be accomplished as described in connection with FIG. 1. For example, the electronic device 102 may obtain depth information and/or other information (e.g., measured information for obtaining depth information) from one or more depth sensors 108 at a second sampling. The second depth map may be determined based on the depth information. For example, the second depth map may be the depth information (e.g., all or a subset of the depth information) and/or may be based on the depth information (e.g., the second depth map may be a transformed version of the depth information). For instance, the electronic device 102 may obtain 204 a second depth map, where the second depth map includes second depth information of a second portion of a scene sampled by the depth sensors at the second sampling. Additionally or alternatively, the electronic device 102 may request and/or receive the second depth map from a remote depth sensor and/or from another device.

The electronic device 102 may obtain 206 displacement information indicative of a displacement of the depth sensor. This may be accomplished as described in connection with FIG. 1. For example, the electronic device 102 may obtain 206 displacement information based on motion information provided by one or more motion sensors 110.

The electronic device 102 may generate 208 a corrected depth map by correcting erroneous depth information. For example, the electronic device 102 may generate 208 a corrected depth map by correcting erroneous depth information based on the first depth information (from a first sampling), the second depth information (from a second sampling) and the displacement information. In some configurations, this may be accomplished as described in connection with one or more of FIGS. 1, 5-7 and 9. In some configurations, correcting 206 erroneous depth information may include transforming a depth map. For example, the electronic device 102 may transform the first depth map based on the displacement information to produce a transformed depth map. Transforming a depth map may be accomplished as described in connection with FIG. 8 in some configurations. In some approaches, the electronic device 102 may then replace erroneous depth information of the second depth map with corresponding depth information (e.g., non-erroneous depth information) of the transformed depth map. For example, the electronic device 102 may fill the outages (e.g., holes) of the second depth map with depths from the transformed depth map. In some approaches, the electronic device 102 may replace the erroneous depth information with one or more interpolated depths (based on the same depth map and/or one or more transformed depth maps, for example). In some approaches, the electronic device 102 may average the erroneous depth information with one or more depths (from the same depth map and/or one or more transformed depth maps, for example). Accordingly, correcting 206 erroneous depth information may include transforming a depth map, replacing erroneous depth information and/or averaging erroneous depth information depending on the configuration. It should be noted that generating 208 a corrected depth map (e.g., correcting erroneous depth information) may not include interpolation and/or averaging in some configurations.

In some configurations, the electronic device 102 may generate an image visualization based on the depth map. This may be accomplished as described in connection with FIG. 1. For example, the electronic device 102 may generate a 3D model based on the depth map. In some configurations, the electronic device 102 may map image data onto the 3D model and/or render the 3D with image data to produce the image visualization. The image visualization may be provided to a display for presentation. For example, the electronic device 102 (e.g., processor 112) may provide the image visualization to a display (e.g., a display 122 included in the electronic device 102 or to a display that is coupled to and/or in communication with the electronic device 102). The display may present the image visualization.

Figure 3:
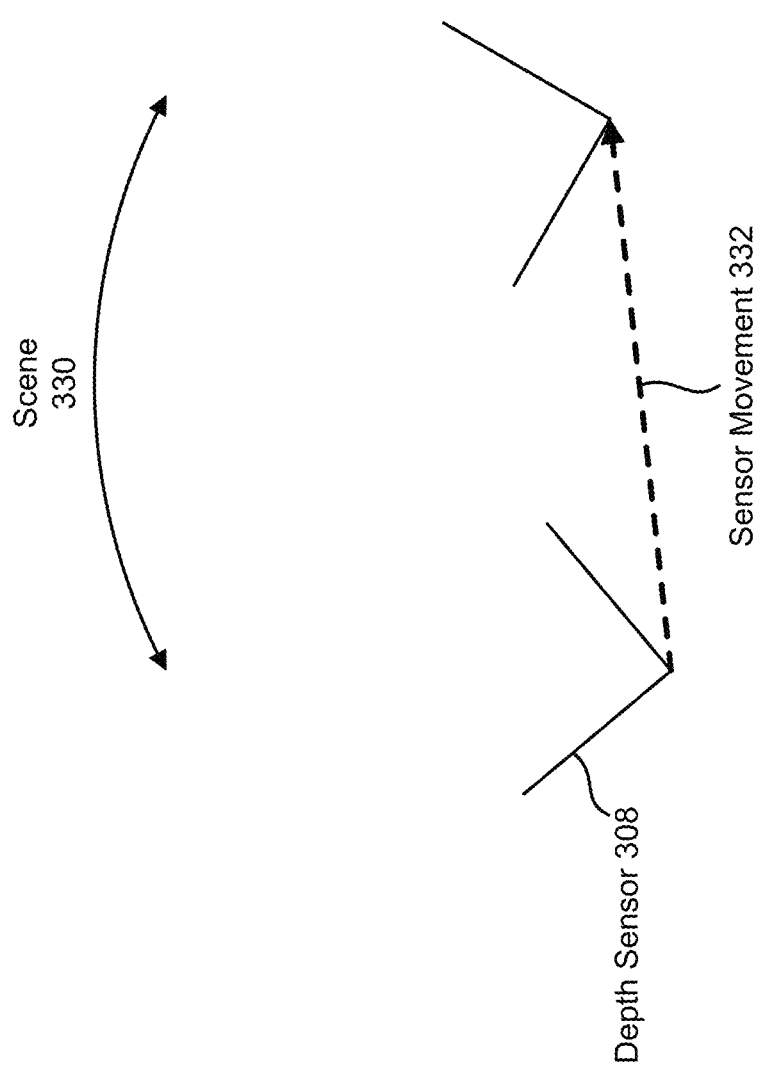
FIG. 3 is a diagram illustrating one example of depth sensor movement.

FIG. 3 is a diagram illustrating one example of depth sensor movement 332. In particular, FIG. 3 illustrates a depth sensor 308. Initially, the depth sensor 308 is at the left side of the diagram and is pointed towards a scene 330. A scene 330 may be any space with depth (e.g., a depth scene). In this example, the sensor movement 332 may include a translation to the right and a rotation to the left. Movement 332 of the depth sensor 308 may cause difficulties in correcting erroneous depth information (e.g., outages, holes, etc.).

Figure 4:
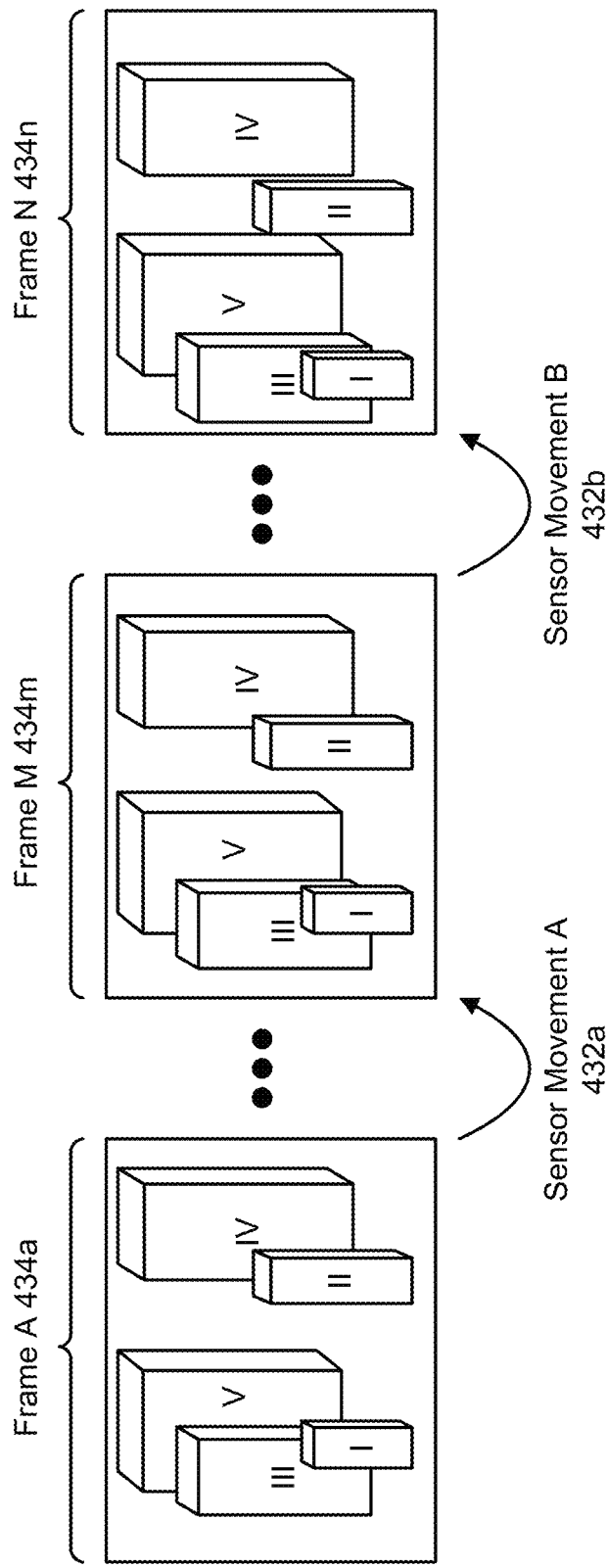
FIG. 4 illustrates another example of depth sensor movement.

FIG. 4 illustrates another example of depth sensor movement 432*a-b*. In FIG. 4, a sequence of image frames 434*a-n* is illustrated. The image frames 434*a-n* may illustrate examples of detection fields of a depth sensor. As described above, one example of a depth sensor may be a set of stereoscopic cameras. It should be noted that other types of depth sensors may be utilized, which may sense depth without the use of visual domain information. In FIG. 4, the depth sensor is moved from left to right over a number of frames 434*a-n*. Specifically, sensor movement A 432*a* occurs between frame A 434*a* and frame M 434*m*. Sensor movement B 432*b* occurs between frame M 434*m* and frame N 434*n*. There may or may not be one or more additional frames between frame A 434*a* and frame M 434*m* and/or between frame M 434*m* and frame N 434*n*. In accordance with the systems and methods disclosed herein, motion information (e.g., sensor movement A 432*a* and sensor movement B 432*b*) may be obtained (e.g., known) with a motion sensor.

As can be observed in FIG. 4, the objects I-V are located over a range of depth from the depth sensor. In particular, objects I and II are the closest to the depth sensor, object III is farther, object IV is even farther, and then object V is the farthest from the depth sensor. Because the objects I-V are located at different distances, the nearer objects may exhibit greater movement in the frame over time. For example, objects I and II move the most between frame I 434*a* and frame N 434*n*, while object V moves the least.

Figure 5:
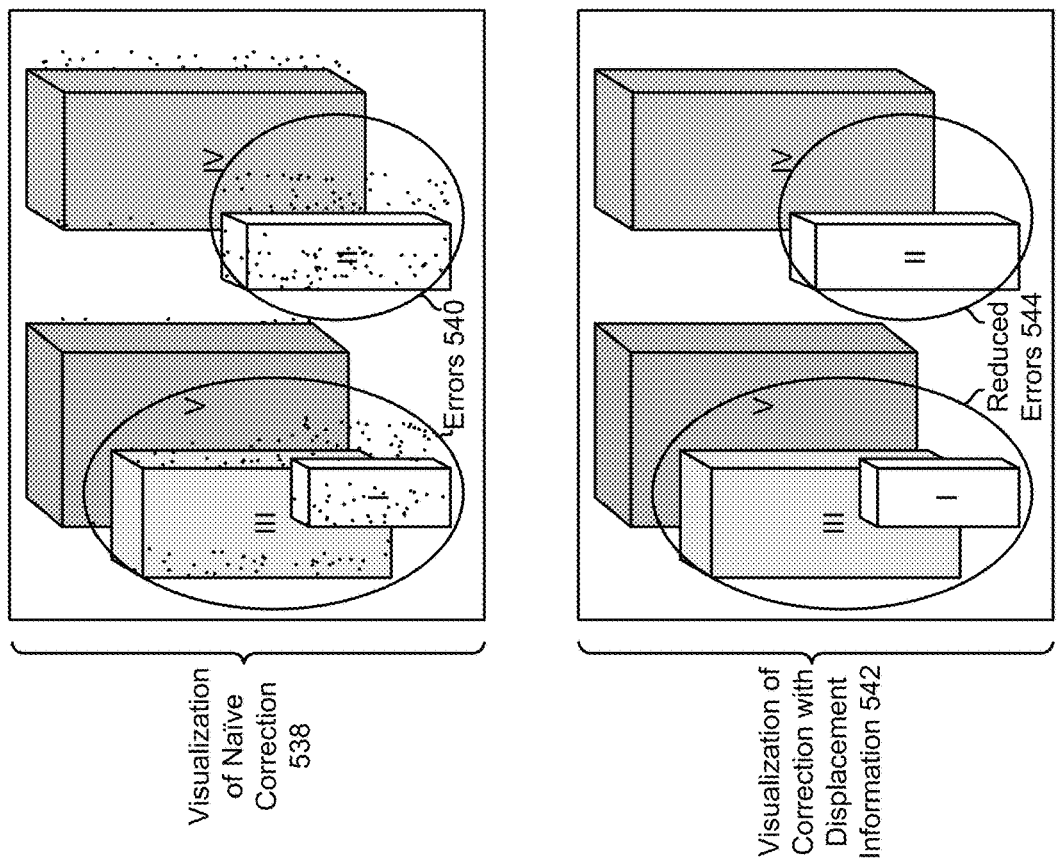
FIG. 5 illustrates examples of a depth map visualization with erroneous depth information, a visualization of naïve correction, and a visualization of correction with displacement information.
Figure 5:
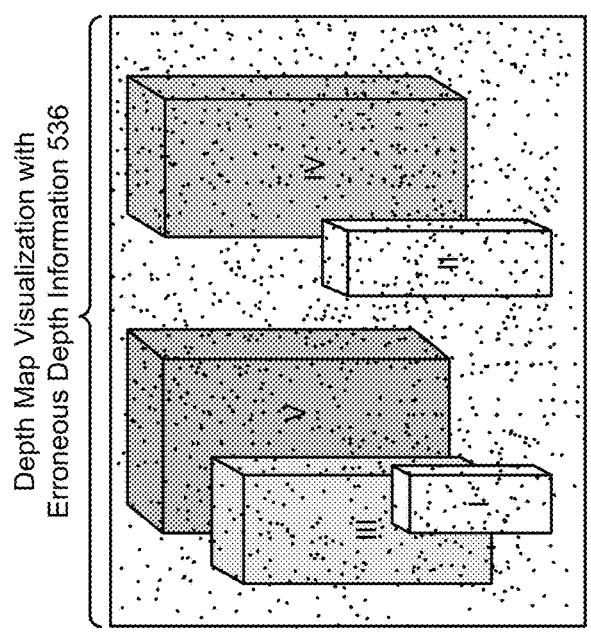

FIG. 5 illustrates examples of a depth map visualization with erroneous depth information 536, a visualization of naïve correction 538, and a visualization of correction with displacement information 542. Specifically, the depth map visualization with erroneous depth information 536 is a visualization of a depth map, where shorter distances (e.g., depths) are depicted as lighter shades and larger distances are depicted with darker shades. In FIG. 5, the depth map visualization with erroneous depth information 536 is a corrupted frame where erroneous depth information (e.g., outages, holes, etc.) of the depth sensor are depicted as black dots.

The visualization of naïve correction 538 illustrates an example of taking a simple average between depth maps, where the depth sensor has moved between samplings. As can be observed in the naïve correction, errors 540 occur at depth discontinuities due to unknown object displacements. Errors 540 may occur particularly along the contours of objects. For example, as a depth sensor is shifted, objects in the foreground have a greater displacement than objects in the background. These different displacements may cause errors in a naïve frame-to-frame correction.

In the visualization of correction with displacement information 542, it can be observed that correcting erroneous depth information in accordance with the systems and methods disclosed herein may result in reduced errors 544. For example, the relative camera position from accelerometer depth information gives improved frame-to-frame mapping for improved error correction.

Figure 6:
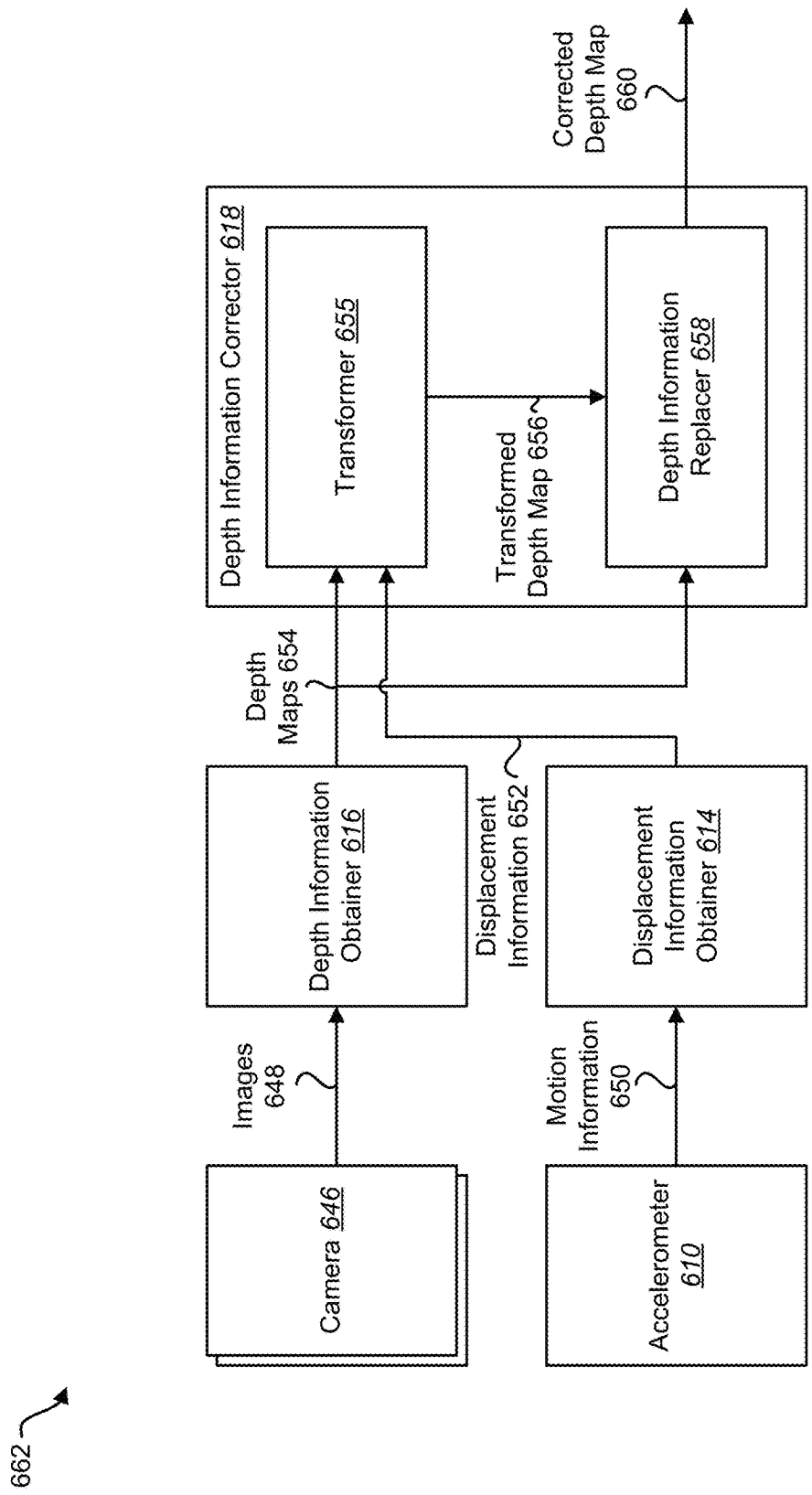
FIG. 6 is a block diagram illustrating more specific examples of elements that may be implemented in accordance with the systems and methods disclosed herein.

FIG. 6 is a block diagram illustrating more specific examples of elements 662 that may be implemented in accordance with the systems and methods disclosed herein. The elements 662 may include cameras 646, a displacement information obtainer 614, a depth information obtainer 616, and/or a depth information corrector 618. One or more of the elements 662 may be implemented on the same electronic device or on separate electronic devices. In some configurations, one or more of the elements 662 may be examples of corresponding elements described in connection with FIG. 1. For example, one or more of the elements 662 described in connection with FIG. 6 may be implemented on the electronic device 102 described in connection with FIG. 1.

Multiple cameras 646 may capture multiple images 648 (e.g., camera inputs). The cameras 646 may be examples of the image sensor(s) 104 and optical system(s) 106 described in connection with FIG. 1. For example, each camera 646 may include an image sensor and an optical system. In this example, the cameras 646 may be an example of the depth sensor 108 described in connection with FIG. 1.

The cameras 646 may capture differing but overlapping images 648. In some examples, two cameras 646 may be separated by a distance and mounted on one or more devices or bodies. In one example, multiple cameras 646 may be mounted on a drone to capture images 648 of a scene. In another example, multiple (action) cameras 646 may be attached to a user (e.g., wearer) to capture images 648 of a scene. In yet other examples, multiple cameras 646 may be mounted in different locations on a smartphone, video camera, still camera, security camera, frame, head-mounted device (e.g., virtual reality headset, augmented reality headset, mixed reality headset, helmet, glasses), gaming device, television, appliance, airplane, boat, bicycle, vehicle (e.g., car), house, building, weapon (e.g., firearm), etc. These cameras 646 may capture multiple images 648 of a scene viewed by the cameras 646. For example, the images 648 may portray adjacent and/or overlapping areas of the scene. The images 648 may be provided to a depth information obtainer 616. It should be noted that although cameras 646 are described in connection with FIG. 6, additional or alternative depth sensors may be utilized in accordance with the systems and methods disclosed herein.

The depth information obtainer 616 may obtain depth maps 654 based on the images 648. The depth information obtainer 616 described in connection with FIG. 6 may be an example of the depth information obtainer 116 described in connection with FIG. 1. For example, the depth information obtainer 616 may obtain the depth maps 654 based on stereoscopic triangulation and/or other depth sensing. The depth maps 654 may be provided to the depth information corrector 618. In some configurations, the depth information obtainer 616 may detect erroneous depth information as described in connection with one or more of FIGS. 1 and 9.

The accelerometer 610 may obtain motion information 650. The accelerometer 610 described in connection with FIG. 6 may be an example of the motion sensor 110 described in connection with FIG. 1. The accelerometer 610 may produce motion information 650. The motion information 650 may indicate the motion of the accelerometer (e.g., translation(s) and/or rotation(s) over time). The motion information 650 may be provided to the displacement information obtainer 614. It should be noted that although an accelerometer 610 is described in connection with FIG. 6, additional or alternative motion sensors may be utilized in accordance with the systems and methods disclosed herein.

The displacement information obtainer 614 may obtain displacement information 652 based on the motion information 650. For example, the displacement information obtainer 614 may determine a positional difference (e.g., rotational difference, such as pitch, yaw, and/or roll, and/or translational difference, such as forward/back, left/right, and/or up/down) between sampling times corresponding to the images 648. In some configurations, the timing on motion information 650 capture may be approximately synchronized with the image 648 capture (or measured information capture, for example). The displacement information obtainer 614 described in connection with FIG. 6 may be an example of the displacement information obtainer 114 described in connection with FIG. 1. The displacement information 652 may be provided to the depth information corrector 618.

The depth information corrector 618 may correct erroneous depth information in at least one of the depth maps 654. The depth information corrector 618 described in connection with FIG. 6 may be one example of the depth information corrector 118 described in connection with FIG. 1. In some configurations, the depth information corrector 618 may include a transformer 655 and/or a depth information replacer 658.

The transformer 655 may receive at least one of the depth maps 654. The transformer 655 may receive the displacement information 652. The transformer 655 may transform a first depth map 654 based on the displacement information 652 to produce a transformed depth map 656. This may be accomplished as described in connection with one or more of FIGS. 1 and 8, for example. The transformer 655 may provide the transformed depth map 656 to the depth information replacer 658.

The depth information replacer 658 may replace the erroneous depth information (e.g., one or more erroneous depths) of a second depth map 654 with corresponding depth information of the transformed depth map 656. This may be accomplished as described in connection with one or more of FIGS. 1 and 9, for example. Replacing the erroneous depth information of the second depth map 654 with the corresponding depth information of the transformed depth map 656 may produce a corrected depth map 660.

The corrected depth map 660 may be provided to one or more elements. For example, the corrected depth map 660 may be provided to a visualization element. The visualization element may produce a visual representation of the corrected depth map 660. For example, the visualization element may present one or of the depth information (e.g., numerical depths) in the corrected depth map 660. Additionally or alternatively, the visualization element may generate a 3D model based on the corrected depth map 660. Image data (e.g., from the images 648) may be rendered on the corrected depth map in some configurations.

In some configurations, the corrected depth map 660 may be provided to a driving element. The driving element may control a vehicle and/or output information based on the corrected depth map 660 as described above.

Figure 7:
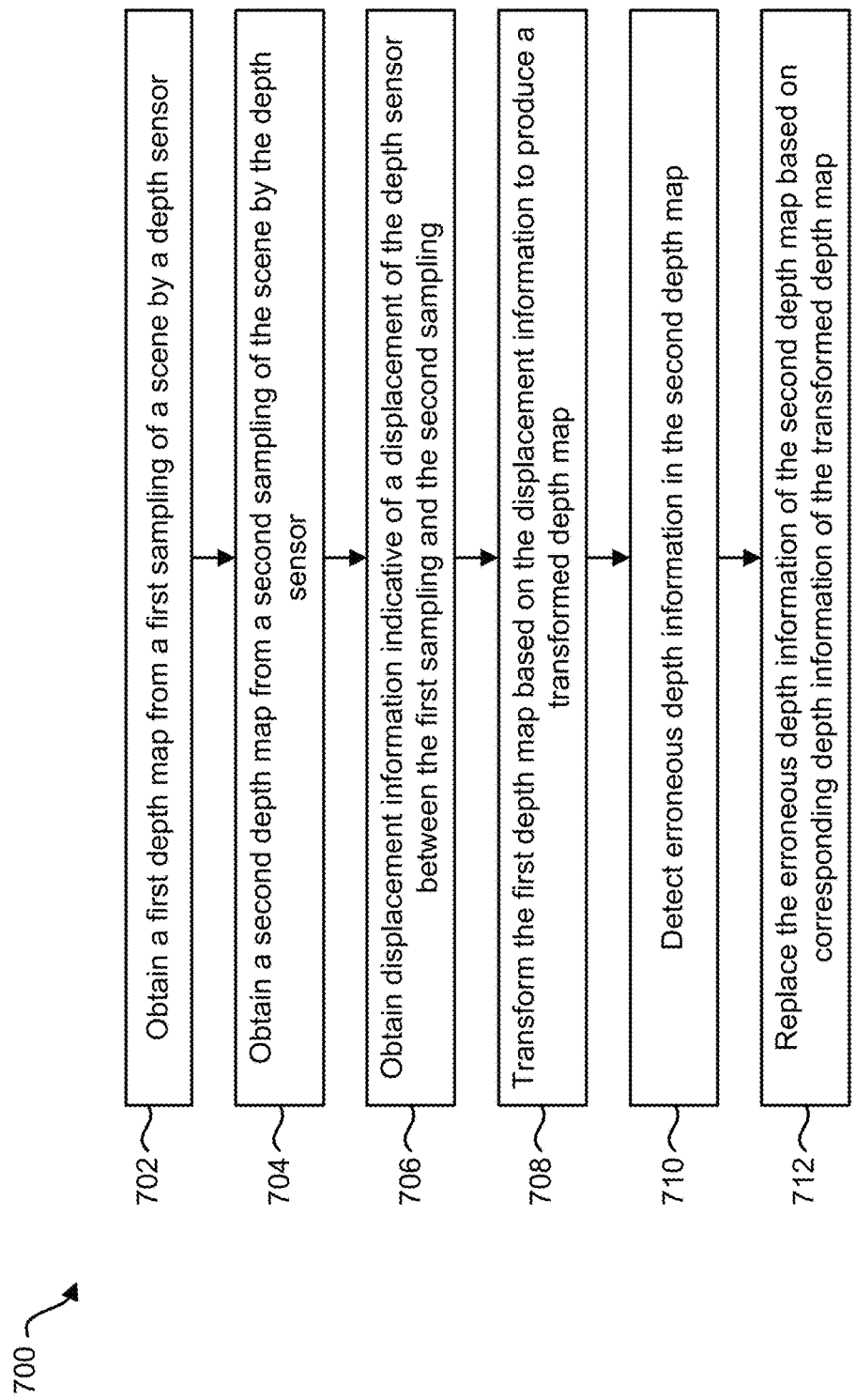
FIG. 7 is a flow diagram illustrating one configuration of a method for correcting erroneous depth information.

FIG. 7 is a flow diagram illustrating one configuration of a method 700 for correcting erroneous depth information. The method 700 may be performed by the electronic device 102 described in connection with FIG. 1 and/or one or more of the elements 662 described in connection with FIG. 6.

The electronic device 102 may obtain 702 a first depth map from a first sampling of a scene by a depth sensor 108. This may be accomplished as described above in connection with one or more of FIGS. 1-2 and 6. For example, the electronic device 102 may obtain 702 a first depth map, where the first depth map includes first depth information of a first portion of a scene sampled by a depth sensor at a first sampling.

The electronic device 102 may obtain 704 a second depth map from a second sampling of a scene by a depth sensor 108. This may be accomplished as described above in connection with one or more of FIGS. 1-2 and 6. For example, the electronic device 102 may obtain 702 a second depth map, where the second depth map includes second depth information of a second portion of a scene sampled by the depth sensor at the second sampling.

The electronic device 102 may obtain 706 displacement information indicative of a displacement of the depth sensor 108 between the first sampling and the second sampling (e.g., from the first sampling to the second sampling). This may be accomplished as described above in connection with one or more of FIGS. 1-2 and 6.

The electronic device 102 may transform 708 the first depth map based on the displacement information to produce a transformed depth map. This may be accomplished as described above in connection with one or more of FIGS. 1-2 and 6.

The electronic device 102 may detect 710 erroneous depth information in the second depth map. The may be accomplished as described in connection with one or more of FIGS. 1 and 9. For example, the electronic device 102 may detect 710 erroneous depth information by comparing one or more depths with one or more neighboring depths in the same depth map (e.g., spatially interpolated depths, spatially averaged depths) and/or by comparing the one or more depths with one or more depths from one or more transformed depth maps (e.g., transformed previous depth map(s) and/or transformed subsequent depth map(s)).

The electronic device 102 may replace 712 erroneous depth information of the second depth map based on corresponding depth information of the transformed depth map. This may be accomplished as described in connection with one or more of FIGS. 1-2, 6 and 9. For example, the electronic device 102 may replace erroneous depth information of the second depth map with corresponding depth information of the transformed depth map. Additionally or alternatively, the electronic device 102 may replace the erroneous depth information with one or more depth interpolations (e.g., temporal depth interpolation(s), spatio-temporal depth interpolation(s), temporal average(s), spatio-temporal average(s), etc.) based on corresponding depth information of the transformed depth map. Alternatively, the electronic device 102 may average the erroneous depth information with one or more depths from the same and/or different (e.g., previous and/or subsequent) depth map(s).

In some configurations, the electronic device 102 may utilize one or more transformed depth values (e.g., the transformed depth map, re-projected depth values, etc.) and local neighborhood depth values in order to correct a depth map. For example, the electronic device 102 may utilize a transformed depth value and one or more local neighborhood depth values around an outage to perform a joint estimation of a corrected depth value.

In some configurations, the electronic device 102 may correct the depth map as follows. The electronic device 102 may aggregate depth information from multiple depth maps (e.g., views, transformed depth maps, etc.) according to sensor movement. Then, the electronic device 102 may apply filtering (e.g., interpolation, averaging, a median, a mean, etc.) amongst the depth values to estimate the correct depth. It should be noted that generating a corrected depth map and/or correcting erroneous depth information may include transforming 708 a depth map and/or replacing 712 the erroneous depth information.

Figure 8:
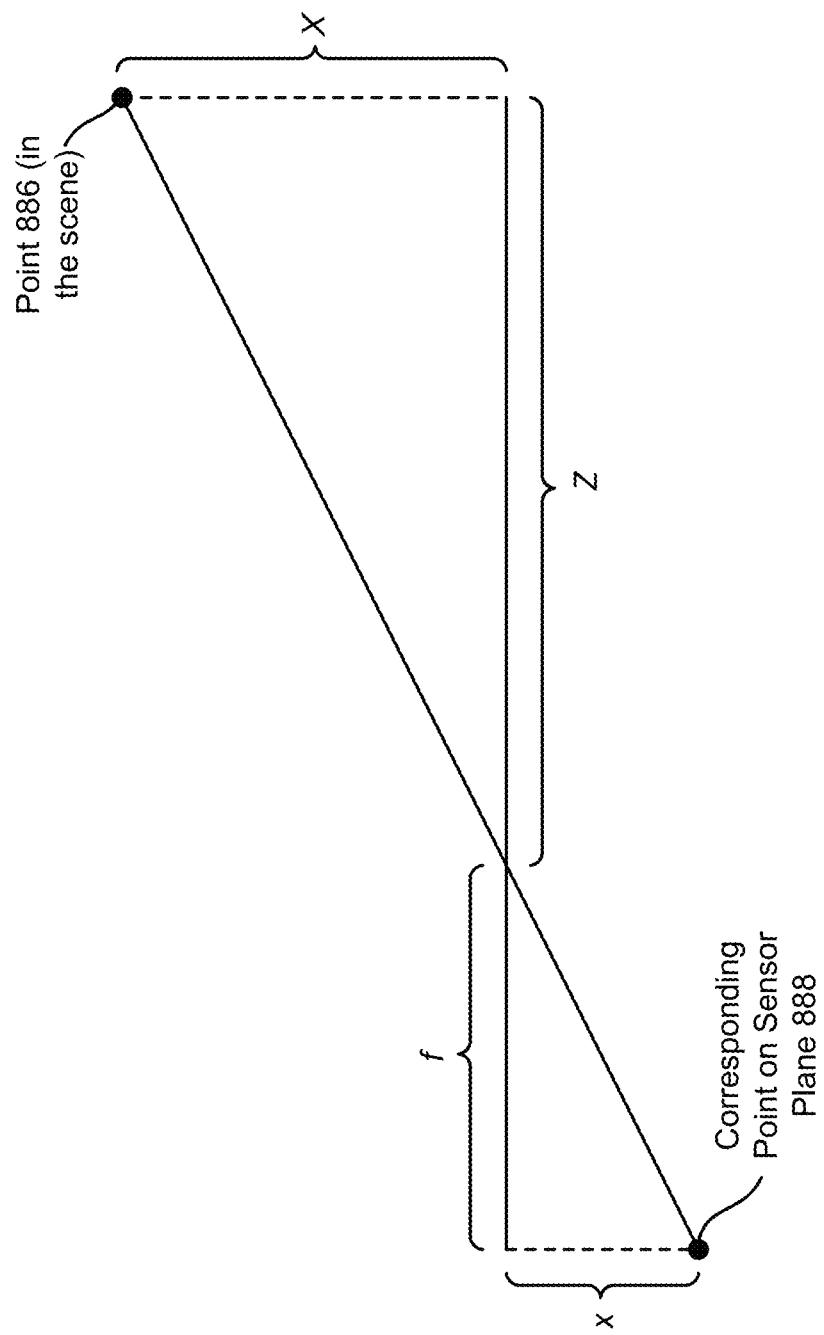
FIG. 8 is a diagram illustrating one example of a transform that may be performed in accordance with the systems and methods disclosed herein.

FIG. 8 is a diagram illustrating one example of a transform that may be performed in accordance with the systems and methods disclosed herein. For example, the electronic device 102 (e.g., depth information corrector 118) may transform a first depth map based on displacement information to produce a transformed depth map. In some configurations, the electronic device 102 may transform one or more depth maps (e.g., depth information) in accordance with the approach described in connection with FIG. 8.

For example, the electronic device 102 may obtain a first depth map as described in connection with FIG. 1. The first depth map may include a set of depths of a first portion of a scene at a first sampling. The depth sensor may move between the first sampling and a second sampling. Motion information (e.g., displacement information) may indicate a displacement of the depth sensor between the first sampling and the second sampling. For example, the motion information and/or the displacement information may be and/or may indicate a rotational matrix (e.g., R) and a translational matrix (e.g., T) that reflect the displacement between the first sampling and the second sampling. The electronic device 102 may obtain a second depth map, which may include another set of depths of a second portion of the scene at the second sampling.

In particular, FIG. 8 illustrates a point 886 in the scene. A corresponding point on the sensor plane 888 (e.g., depth sensor plane) is also illustrated. In this example, f is the focal length of the optical system (e.g., sensor with lens, camera, etc.). The focal length f of the depth sensor (e.g., optical system, camera, etc.) may be known and/or predetermined. Z may be the depth of a point 886 in a world coordinate system and x, y may be the location of the sensed data (e.g., image, depth, etc.) of the point on the sensor plane 888 (at the first sampling, for instance). For example, each of the depths (e.g., Z) of the first depth map may be located at different points (e.g., x, y) on the depth sensor plane.

The electronic device 102 (e.g., depth information corrector 118) may transform a depth map (e.g., first depth map) to produce a transformed depth map. For example, the world coordinate of the point 886 (e.g., X, Y, Z) may be computed based on the depth Z and the corresponding point 888 $(x, y)$, where X=Z*f/x and Y coordinate may be similarly computed (e.g., Y=Z*f/y). For example, the electronic device 102 (e.g., processor 112) may project one or more sensor plane points (x,y) to one or more world coordinate points P=(X,Y,Z).

Upon obtaining the point 886 P=(X,Y,Z) in the world coordinate system, the electronic device 102 may rotate (e.g., R) and/or translate (e.g., T) the world coordinate point 886 (e.g., one or more of the world coordinate points 886 corresponding to the first depth map) according to the rotation and translation of the sensor. For example, the electronic device 102 may determine one or more rotated and/or translated points P'=(X', Y', Z')=R*P+T (where R is a 3 by 3 rotation matrix and T a 1 by 3 translation vector, for instance). The rotated and/or translated point(s) P'=(X', Y', Z') may then be projected back on the sensor plane of the new viewpoint, yielding x' and y'. For example, the electronic device 102 may compute x'=f*Z'/X' and y'=f*Z'/Y'. The set of depths Z' at the sensor plane of the new viewpoint (e.g., the viewpoint at the second sampling, (x', y')) may be the transformed depth map.

FIG. 9 is a diagram illustrating examples of depths 984, 986, 988 (e.g., depth values). In particular, FIG. 9 illustrates examples of approaches for detecting erroneous depth information. In FIG. 9, depths (n−1) 984 correspond to a previous frame and/or previous sampling of a scene (e.g., a first depth map), depths (n) 986 correspond to a current frame and/or current sampling of a scene (e.g., a second depth map), and depths (n+1) 988 correspond to a subsequent frame and/or subsequent sampling of a scene (e.g., a third depth map). For instance, depths (n−1) 984 may be part of a previous depth map (or transformed previous depth map), depths (n) 986 may be part of a current depth map, and depths (n+1) 988 may be part of a subsequent depth map (or transformed subsequent depth map). In some of the following examples, the depth $d_{n,x,y}$ may be evaluated (by the processor 112 and/or depth information obtainer 116, for example) to determine whether the depth $d_{n,x,y}$ is erroneous (e.g., erroneous depth information) or not.

In some configurations, the depth $d_{n,x,y}$ may be evaluated based on one or more depths (e.g., neighboring depths) in the same frame (e.g., $d_{n,x-1,y-1}$, $d_{n,x,y-1}$, $d_{n,x+1,y-1}$, $d_{n,x-1,y}$, $d_{n,x+1,y}$, $d_{n,x-1,y+1}$, $d_{n,x,y+1}$, and/or $d_{n,x+1,y+1}$). For example, an interpolation (e.g., average, mean, median, weighted average, linear interpolation, bilinear interpolation, spline interpolation, polynomial interpolation, etc.) of two or more of the depths (e.g., neighboring depths) may be determined to produce a spatial depth interpolation (e.g., $d_{s,int}$). In some approaches, two neighboring depths (e.g., $d_{n,x-1,y}$ and $d_{n,x+1,y}$; $d_{n,x-1,y-1}$ and $d_{n,x+1,y+1}$; $d_{n,x,y-1}$ and $d_{n,x,y+1}$; $d_{n,x,y-1}$ and $d_{n,x-1,y+1}$, etc.) may be interpolated (e.g., averaged). In some approaches, four neighboring depths (e.g., $d_{n,x-1,y}$, $d_{n,x+1,y}$, $d_{n,x,y-1}$ and $d_{n,x,y+1}$; $d_{n,x-1,y-1}$, $d_{n,x+1,y+1}$; $d_{n,x+1,y-1}$ and $d_{n,x-1,y+1}$, etc.) may be interpolated (e.g., averaged). In some configurations, eight neighboring depths (e.g., $d_{n,x-1,y-1}$, $d_{n,x,y-1}$, $d_{n,x+1,y-1}$, $d_{n,x-1,y}$, $d_{n,x+1,y}$, $d_{n,x-1,y+1}$, $d_{n,x,y+1}$, and $d_{n,x+1,y+1}$) may be interpolated (e.g., averaged). Additionally or alternatively, one or more other depths that are further (e.g., further than immediate neighbors) from the depth being evaluated (e.g., $d_{n,x-2,y}$, $d_{n,x+2,y}$, $d_{n,x,y-2}$ and $d_{n,x,y+2}$; etc.) may be included in the interpolation calculation.

The electronic device 102 may detect erroneous depth information by comparing a depth to a spatial depth interpolation (e.g., $d_{s,int}$). For example, if the depth (e.g., $d_{n,x,y}$) is more than a threshold amount away from the spatial depth interpolation (e.g., $d_{s,int}$), the electronic device 102 may determine that the depth is erroneous. For instance, if $d_{n,x,y} < d_{s,int} - \text{threshold}_{s,low}$ (where $\text{threshold}_{s,low}$ is a first threshold value) and/or if $d_{n,x,y} > d_{s,int} + \text{threshold}_{s,high}$ (where $\text{threshold}_{s,high}$ is a second threshold value), $d_{n,x,y}$ may be detected as erroneous depth information. The threshold value(s) may be in units of distance (e.g., inches, feet, meters, etc.). The first and second threshold values may be the same or different.

In some configurations, the depth $d_{n,x,y}$ may be evaluated based on one or more transformed (e.g., re-projected) depths from one or more previous frames (e.g., $d_{n-1,x-1,y-1}$, $d_{n-1,x,y-1}$, $d_{n-1,x+1,y-1}$, $d_{n-1,x-1,y}$, $d_{n-1,x,y}$, $d_{n-1,x+1,y}$, $d_{n-1,x-1,y+1}$, $d_{n-1,x,y+1}$, and/or $d_{n-1,x+1,y+1}$) and/or from one or more subsequent frames (e.g., $d_{n+1,x-1,y-1}$, $d_{n+1,x,y-1}$, $d_{n+1,x+1,y-1}$, $d_{n+1,x-1,y}$, $d_{n+1,x,y}$, $d_{n+1,x+1,y}$, $d_{n+1,x-1,y+1}$, $d_{n+1,x,y+1}$, and/or $d_{n+1,x+1,y+1}$). For example, the electronic device 102 (e.g., processor 112, depth information obtainer 116, etc.) may compare the depth that is being evaluated (e.g., $d_{n,x,y}$) to a corresponding transformed depth from a previous frame (e.g., $d_{n-1,x,y}$). If the depth (e.g., $d_{n,x,y}$) is more than a threshold amount away from the corresponding transformed depth (e.g., $d_{n-1,x,y}$), the electronic device 102 may determine that the depth is erroneous. For instance, if $d_{n,x,y} < d_{n-1,x,y} - \text{threshold}_{n-1,low}$ and/or if $d_{n,x,y} > d_{n-1,x,y} + \text{threshold}_{n-1,high}$, $d_{n,x,y}$ may be detected as erroneous depth information. A similar approach could be additionally or alternatively performed for a subsequent frame (e.g., $d_{n+1,x,y}$).

In some configurations, the depth $d_{n,x,y}$ may be evaluated based on transformed (e.g., re-projected) depths from one or more previous frames and/or from one or more subsequent frames. For example, the electronic device 102 (e.g., processor 112, depth information obtainer 116, etc.) may determine an interpolation (e.g., average, mean, median, weighted average, linear interpolation, bilinear interpolation, spline interpolation, polynomial interpolation, etc.) of two or more transformed depths from one or more previous frames and/or from one or more subsequent frames. In one example, the electronic device 102 may determine a temporal interpolation of a corresponding transformed depth from a previous frame (e.g., $d_{n-1,x,y}$) and a corresponding transformed depth from a subsequent frame (e.g., $d_{n+1,x,y}$) to produce a temporal depth interpolation (e.g., $d_{t,int}$). If the depth (e.g., $d_{n,x,y}$) is more than a threshold amount away from the temporal depth interpolation (e.g., $d_{t,int}$), the electronic device 102 may determine that the depth is erroneous. For instance, if $d_{n,x,y} < d_{t,int} - \text{threshold}_{t,low}$ and/or if $d_{n,x,y} > d_{t,int} + \text{threshold}_{t,high}$, $d_{n,x,y}$ may be detected as erroneous depth information. In some examples, depths from multiple previous frames and/or depths from multiple subsequent frames may be interpolated to produce the temporal depth interpolation (e.g., $d_{t,int}$).

In some configurations, the depth $d_{n,x,y}$ may be evaluated based on a combination of one or more depths in the same frame and one or more transformed (e.g., re-projected) depths from one or more previous frames and/or from one or more subsequent frames. For example, the electronic device 102 (e.g., processor 112, depth information obtainer 116, etc.) may determine a spatial interpolation (e.g., average, mean, median, weighted average, linear interpolation, bilinear interpolation, spline interpolation, polynomial interpolation, etc.) of two or more depths (e.g., neighboring depths) from the same frame, a spatial interpolation of two or more transformed depths from one or more previous frames and/or a spatial interpolation of transformed depths from one or more subsequent frames. For example, the electronic device 102 may determine a spatial interpolation of two or more depths 984 (e.g., 2-9 depths, etc.) of the previous frame, a spatial interpolation of two or more depths 986 (e.g., 2-9 depths, 2-8 neighboring depths, etc.) of the current frame, and/or a spatial interpolation of two or more depths 988 (e.g., 2-9 depths, etc.) of the subsequent frame. The electronic device 102 may additionally determine a temporal interpolation of two or more depths (e.g., depths and/or spatial interpolation depths) from the previous frame, the current frame, and/or the subsequent frame. In some examples, the electronic device 102 may be interpolated in both spatial dimensions and temporal dimensions to determine a spatio-temporal interpolation (e.g., $d_{s,t,int}$) of depths from a previous frame, a current frame and/or a subsequent frame. If the depth (e.g., $d_{n,x,y}$) is more than a threshold amount away from the spatio-temporal depth interpolation (e.g., $d_{s,t,int}$), the electronic device 102 may determine that the depth is erroneous. For instance, if $d_{n,x,y} < d_{s,t,int} - \text{threshold}_{s,t,low}$ and/or if $d_{n,x,y} > d_{s,t,int} + \text{threshold}_{s,t,high}$, $d_{n,x,y}$ may be detected as erroneous depth information.

In some examples, a spatial depth interpolation $d_{s,int}$ and a temporal depth interpolation (e.g., $d_{t,int}$) may be determined separately. The electronic device 102 may determine whether the depth (e.g., $d_{n,x,y}$) is erroneous based on a combination of depth and spatial criteria. For example, if $d_{n,x,y} < d_{s,int} - \text{threshold}_{s,low}$ (where $\text{threshold}_{s,low}$ is a first threshold value) and/or if $d_{n,x,y} > d_{s,int} + \text{threshold}_{s,high}$ (where $\text{threshold}_{s,high}$ is a second threshold value), or if $d_{n,x,y} < d_{t,int} - \text{threshold}_{t,low}$ and/or if $d_{n,x,y} > d_{t,int} + \text{threshold}_{t,high}$, $d_{n,x,y}$ may be detected as erroneous depth information.

In some of the following examples, the depth $d_{n,x,y}$ may be corrected (by the processor 112 and/or depth information corrector 118, for example), for a case that the depth $d_{n,x,y}$ is erroneous depth information. In some configurations, the depth $d_{n,x,y}$ may be corrected based on one or more depths (e.g., neighboring depths) in the same frame (e.g., $d_{n,x-1,y-1}$, $d_{n,x,y-1}$, $d_{n,x+1,y-1}$, $d_{n,x-1,y}$, $d_{n,x+1,y}$, $d_{n,x-1,y+1}$, $d_{n,x,y+1}$, and/or $d_{n,x+1,y+1}$). For example, an interpolation (e.g., average, mean, median, weighted average, linear interpolation, bilinear interpolation, spline interpolation, polynomial interpolation, etc.) of two or more of the neighboring depths may be determined to produce a neighboring spatial depth interpolation (e.g., $d_{s,int}$). In some approaches, two neighboring depths (e.g., $d_{n,x-1,y}$ and $d_{n,x+1,y}$; $d_{n,x-1,y-1}$ and $d_{n,x+1,y+1}$; $d_{n,x,y-1}$ and $d_{n,x,y+1}$; $d_{n,x+1,y-1}$ and $d_{n,x-1,y+1}$, etc.) may be interpolated (e.g., averaged). In some approaches, four neighboring depths (e.g., $d_{n,x-1,y}$, $d_{n,x+1,y}$, $d_{n,x,y-1}$ and $d_{n,x,y+1}$; $d_{n,x-1,y-1}$; $d_{n,x+1,y+1}$; $d_{n,x+1,y-1}$ and $d_{n,x-1,y+1}$, etc.) may be interpolated (e.g., averaged). In some configurations, eight neighboring depths (e.g., $d_{n,x-1,y-1}$, $d_{n,x,y-1}$, $d_{n,x+1,y-1}$, $d_{n,x-1,y}$; $d_{n,x+1,y}$; $d_{n,x-1,y+1}$; $d_{n,x,y+1}$, and $d_{n,x+1,y+1}$) may be interpolated (e.g., averaged). Additionally or alternatively, one or more other depths that are further (e.g., further than immediate neighbors) from the depth being evaluated (e.g., $d_{n,x-2,y}$, $d_{n,x+2,y}$, $d_{n,x,y-2}$ and $d_{n,x,y+2}$; etc.) may be included in the interpolation calculation. The electronic device 102 may correct erroneous depth information by replacing a depth with a spatial depth interpolation (e.g., $d_{s,int}$).

In some configurations, the erroneous depth $d_{n,x,y}$ may be corrected by averaging the erroneous depth $d_{n,x,y}$ with one or more neighboring depths and/or with one or more depth values from one or more transformed depth maps (from one or more previous frames and/or one or more subsequent frames, for example). For instance, the erroneous depth may be averaged with neighboring depths (e.g., $d_{n,x-1,y}$, $d_{n,x,y}$, and $d_{n,x+1,y}$ may be averaged; $d_{n,x-1,y-1}$, $d_{n,x,y}$ and $d_{n,x+1,y+1}$ may be averaged; $d_{n,x,y-1}$, $d_{n,x,y}$ and $d_{n,x,y+1}$ may be averaged; $d_{n,x+1,y-1}$, $d_{n,x,y}$ and $d_{n,x-1,y+1}$ may be averaged; etc.). Additionally or alternatively, the erroneous depth may be averaged with one or more depths from one or more other transformed depth maps (e.g., $d_{n,x-1,y}$, $d_{n,x,y}$ and $d_{n,x+1,y}$ may be averaged; $d_{n-1,x,y}$ and $d_{n,x,y}$ may be averaged; an average of depths from a transformed depth map (in a corresponding 3×3 neighborhood, for example) and $d_{n,x,y}$ (or a 3×3 neighborhood including $d_{n,x,y}$, for example) may be averaged; etc.). In some configurations, the averaging may be weighted. For example, greater weight may be given to the one or more other depth values (e.g., neighboring depth value(s) and/or depth value(s) from a transformed depth map) than to the erroneous depth value.

In some configurations, the erroneous depth $d_{n,x,y}$ may be corrected based on one or more transformed (e.g., re-projected) depths from one or more previous frames (e.g., $d_{n-1,x-1,y-1}$, $d_{n-1,x,y-1}$, $d_{n-1,x+1,y-1}$, $d_{n-1,x-1,y}$, $d_{n-1,x,y}$, $d_{n-1,x+1,y}$, $d_{n-1,x-1,y+1}$, $d_{n-1,x,y+1}$, and/or $d_{n-1,x+1,y+1}$) and/or from one or more subsequent frames (e.g., $d_{n+1,x-1,y-1}$, $d_{n+1,x,y-1}$, $d_{n+1,x+1,y-1}$, $d_{n+1,x-1,y}$, $d_{n+1,x,y}$, $d_{n+1,x+1,y}$, $d_{n+1,x-1,y+1}$, $d_{n+1,x,y+1}$, and/or $d_{n+1,x+1,y+1}$). For example, the electronic device 102 (e.g., processor 112, depth information corrector 118, etc.) may replace the erroneous depth (e.g., $d_{n,x,y}$) with a corresponding transformed depth from a previous frame (e.g., $d_{n-1,x,y}$) or with a corresponding transformed depth from a subsequent frame (e.g., $d_{n+1,x,y}$).

In some configurations, the erroneous depth $d_{n,x,y}$ may be corrected based on transformed (e.g., re-projected) depths from one or more previous frames and/or from one or more subsequent frames. For example, the electronic device 102 (e.g., processor 112, depth information obtainer 116, depth information corrector 118, etc.) may determine an interpolation (e.g., average, mean, median, weighted average, linear interpolation, bilinear interpolation, spline interpolation, polynomial interpolation, etc.) of two or more transformed depths from one or more previous frames and/or from one or more subsequent frames. In one example, the electronic device 102 may determine a temporal interpolation of a corresponding transformed depth from a previous frame (e.g., $d_{n-1,x,y}$) and a corresponding transformed depth from a subsequent frame (e.g., $d_{n+1,x,y}$) to produce a temporal depth interpolation (e.g., $d_{t,int}$). The electronic device 102 (e.g., processor 112, depth information corrector 118, etc.) may replace the erroneous depth (e.g., $d_{n,x,y}$) with the temporal depth interpolation (e.g., $d_{t,int}$).

In some configurations, the erroneous depth $d_{n,x,y}$ may be corrected based on a combination of one or more depths in the same frame and one or more transformed (e.g., re-projected) depths from one or more previous frames and/or from one or more subsequent frames. For example, the electronic device 102 (e.g., processor 112, depth information obtainer 116, depth information corrector 118, etc.) may determine a spatial interpolation (e.g., average, mean, median, weighted average, linear interpolation, bilinear interpolation, spline interpolation, polynomial interpolation, etc.) of two or more depths (e.g., neighboring depths) from the same frame, a spatial interpolation of two or more transformed depths from one or more previous frames and/or a spatial interpolation of transformed depths from one or more subsequent frames. For example, the electronic device 102 may determine a spatial interpolation of two or more depths 984 (e.g., 2-9 depths, etc.) of the previous frame, a spatial interpolation of two or more depths 986 (e.g., 2-9 depths, 2-8 neighboring depths, etc.) of the current frame, and/or a spatial interpolation of two or more depths 988 (e.g., 2-9 depths, etc.) of the subsequent frame. The electronic device 102 may additionally determine a temporal interpolation of two or more depths (e.g., depths and/or spatial interpolation depths) from the previous frame, the current frame, and/or the subsequent frame. In some examples, the electronic device 102 may be interpolated in both spatial dimensions and temporal dimensions to determine a spatio-temporal interpolation (e.g., $d_{s,int}$) of depths from a previous frame, a current frame and/or a subsequent frame. The electronic device 102 (e.g., processor 112, depth information corrector 118, etc.) may replace the erroneous depth (e.g., $d_{n,x,y}$) with the spatio-temporal depth interpolation (e.g., $d_{s,t,int}$).

In some configurations, the electronic device 102 (e.g., depth information corrector 118) may reuse an interpolation determined in erroneous depth detection (e.g., spatial depth interpolation (e.g., $d_{s,int}$), temporal depth interpolation (e.g., $d_{t,int}$) and/or spatio-temporal depth interpolation (e.g., $d_{s,t,int}$), etc.) for correcting erroneous depth information. In some configurations, the depth information obtainer 116 may use a different interpolation for detecting erroneous depth information than is used for correcting erroneous depth information by the depth information corrector 118.

Figure 10:
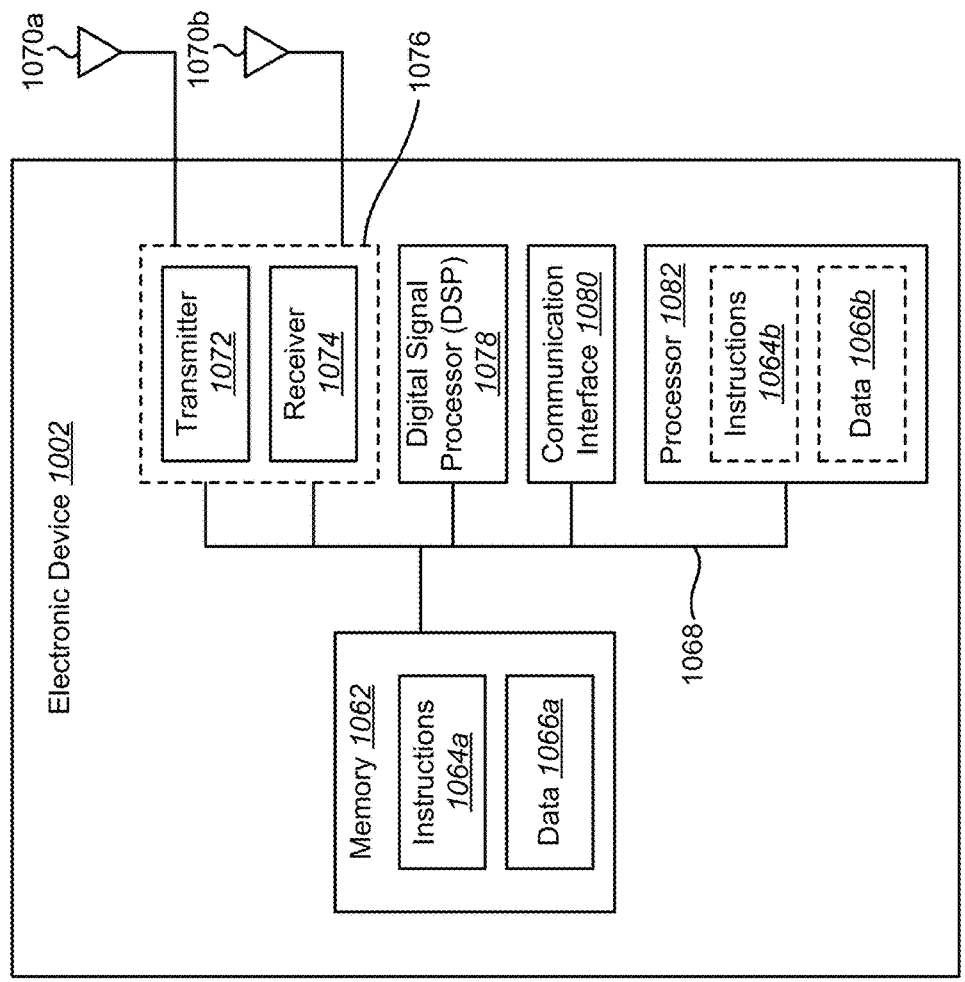
FIG. 10 illustrates certain components that may be included within an electronic device configured to implement various configurations of the systems and methods disclosed herein.

FIG. 10 illustrates certain components that may be included within an electronic device 1002 configured to implement various configurations of the systems and methods disclosed herein. Examples of the electronic device 1002 may include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart appliances, healthcare equipment, gaming consoles, personal digital assistants (PDAs), set-top boxes, surveying devices, mappers, etc. The electronic device 1002 may be implemented in accordance with the electronic device 102 described in connection with FIG. 1 and/or in accordance with one or more of the elements 662 described in connection with FIG. 6. The electronic device 1002 includes a processor 1082. The processor 1082 may be a general purpose single- or multi-chip microprocessor (e.g., an ARM), a special purpose microprocessor (e.g., a digital signal processor (DSP)), a microcontroller, a programmable gate array, etc. The processor 1082 may be referred to as a central processing unit (CPU). Although just a single processor 1082 is shown in the electronic device 1002, in an alternative configuration, a combination of processors (e.g., an ARM and DSP) could be implemented.

The electronic device 1002 also includes memory 1062. The memory 1062 may be any electronic component capable of storing electronic information. The memory 1062 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1066a and instructions 1064a may be stored in the memory 1062. The instructions 1064a may be executable by the processor 1082 to implement one or more of the methods (e.g., method 200, method 700), procedures, steps, and/or functions described herein. Executing the instructions 1064a may involve the use of the data 1066a that is stored in the memory 1062. When the processor 1082 executes the instructions 1064, various portions of the instructions 1064b may be loaded onto the processor 1082 and/or various pieces of data 1066b may be loaded onto the processor 1082.

The electronic device 1002 may also include a transmitter 1072 and a receiver 1074 to allow transmission and reception of signals to and from the electronic device 1002. The transmitter 1072 and receiver 1074 may be collectively referred to as a transceiver 1076. One or more antennas 1070a-b may be electrically coupled to the transceiver 1076. The electronic device 1002 may also include (not shown) multiple transmitters, multiple receivers, multiple transceivers and/or additional antennas.

The electronic device 1002 may include a digital signal processor (DSP) 1078. The electronic device 1002 may also include a communication interface 1080. The communication interface 1080 may allow and/or enable one or more kinds of input and/or output. For example, the communication interface 1080 may include one or more ports and/or communication devices for linking other devices to the electronic device 1002. In some configurations, the communication interface 1080 may include the transmitter 1072, the receiver 1074, or both (e.g., the transceiver 1076). Additionally or alternatively, the communication interface 1080 may include one or more other interfaces (e.g., touchscreen, keypad, keyboard, microphone, camera, etc.). For example, the communication interface 1080 may enable a user to interact with the electronic device 1002.

The various components of the electronic device 1002 may be coupled together by one or more buses, which may include a power bus, a control signal bus, a status signal bus, a data bus, etc. For the sake of clarity, the various buses are illustrated in FIG. 10 as a bus system 1068.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise any medium that can be used to carry or store desired program code in the form of instructions or data structures and that can be accessed by a computer. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device for generating a corrected depth map, comprising:
    a depth sensor;
    a motion sensor coupled to the depth sensor, wherein the motion sensor is configured to determine motion information; and
    a processor coupled to the depth sensor and the motion sensor, wherein the processor is configured to:
        obtain a first depth map, wherein the first depth map comprises first depth information of a first portion of a scene sampled by the depth sensor at a first sampling;
        obtain a second depth map, wherein the second depth map comprises second depth information of a second portion of the scene sampled by the depth sensor at a second sampling;
        obtain, based on the motion information, displacement information indicative of a displacement of the depth sensor between the first sampling and the second sampling;
        transform the first depth map based on the displacement information to produce a transformed depth map;
        determine a spatio-temporal interpolation between at least two depths of the transformed depth map and at least two depths of the second depth map;
        detect erroneous depth information by comparing one or more depths of the second depth map with a value that is based on at least the spatio-temporal interpolation and a threshold; and
        generate a corrected depth map by correcting the erroneous depth information of the second depth map based on the transformed depth map.

2. The electronic device of claim 1, wherein the processor is configured to replace the erroneous depth information with corresponding depth information of the transformed depth map.

3. The electronic device of claim 1, wherein the processor is configured to average non-erroneous depth information of the second depth map with corresponding non-erroneous depth information of the transformed depth map.

4. The electronic device of claim 1, wherein the corrected depth map is not carried over to a next depth map.

5. The electronic device of claim 1, wherein the processor is configured to:
    project one or more points on a depth sensor plane to world coordinates to produce one or more world coordinate points;
    rotate the one or more world coordinate points;
    translate the one or more world coordinate points; and
    re-project the one or more world coordinate points to produce the transformed depth map.

6. The electronic device of claim 1, wherein the erroneous depth information comprises depth sensor outages.

7. A method for generating a corrected depth map by an electronic device, comprising:
    obtaining a first depth map, wherein the first depth map comprises first depth information of a first portion of a scene sampled by a depth sensor at a first sampling;
    obtaining a second depth map, wherein the second depth map comprises second depth information of a second portion of the scene sampled by the depth sensor at a second sampling;
    obtaining displacement information indicative of a displacement of the depth sensor between the first sampling and the second sampling;
    transforming the first depth map based on the displacement information to produce a transformed depth map;
    determining a spatio-temporal interpolation between at least two depths of the transformed depth map and at least two depths of the second depth map;
    detecting erroneous depth information by comparing one or more depths of the second depth map with a value that is based on at least the spatio-temporal interpolation and a threshold; and
    generating a corrected depth map by correcting the erroneous depth information of the second depth map based on the transformed depth map.

8. The method of claim 7, wherein correcting the erroneous depth information comprises replacing the erroneous depth information with corresponding depth information of the transformed depth map.

9. The method of claim 7, further comprising averaging non-erroneous depth information of the second depth map with corresponding non-erroneous depth information of the transformed depth map.

10. The method of claim 7, wherein the corrected depth map is not carried over to a next depth map.

11. The method of claim 7, wherein transforming the first depth map comprises:
    projecting one or more points on a depth sensor plane to world coordinates to produce one or more world coordinate points;
    rotating the one or more world coordinate points;
    translating the one or more world coordinate points; and
    re-projecting the one or more world coordinate points to produce the transformed depth map.

12. The method of claim 7, wherein the erroneous depth information comprises depth sensor outages.

13. An apparatus for generating a corrected depth map, comprising:
    means for obtaining a first depth map, wherein the first depth map comprises first depth information of a first portion of a scene sampled by a depth sensor at a first sampling;
    means for obtaining a second depth map, wherein the second depth map comprises second depth information of a second portion of the scene sampled by the depth sensor at a second sampling;
    means for obtaining displacement information indicative of a displacement of the depth sensor between the first sampling and the second sampling;
    means for transforming the first depth map based on the displacement information to produce a transformed depth map;
    means for determining a spatio-temporal interpolation between at least two depths of the transformed depth map and at least two depths of the second depth map;
    means for detecting erroneous depth information by comparing one or more depths of the second depth map with a value that is based on at least the spatio-temporal interpolation and a threshold; and
    means for generating a corrected depth map by correcting the erroneous depth information of the second depth map based on the transformed depth map.

14. The apparatus of claim 13, further comprising means for replacing the erroneous depth information with corresponding depth information of the transformed depth map.

15. The apparatus of claim 13, wherein the erroneous depth information comprises depth sensor outages.

16. A computer-program product for generating a corrected depth map, comprising a non-transitory tangible computer-readable medium having instructions thereon, the instructions comprising:

code for causing an electronic device to obtain a first depth map, wherein the first depth map comprises first depth information of a first portion of a scene sampled by a depth sensor at a first sampling;

code for causing the electronic device to obtain a second depth map, wherein the second depth map comprises second depth information of a second portion of the scene sampled by the depth sensor at a second sampling;

code for causing the electronic device to obtain displacement information indicative of a displacement of the depth sensor between the first sampling and the second sampling;

code for causing the electronic device to transform the first depth map based on the displacement information to produce a transformed depth map;

code for causing the electronic device to determine a spatio-temporal interpolation between at least two depths of the transformed depth map and at least two depths of the second depth map;

code for causing the electronic device to detect erroneous depth information by comparing one or more depths of the second depth map with a value that is based on at least the spatio-temporal interpolation and a threshold; and code for causing the electronic device to generate a corrected depth map by correcting the erroneous depth information of the second depth map based on the transformed depth map.

17. The computer-program product of claim 16, further comprising code for causing the electronic device to replace the erroneous depth information with corresponding depth information of the transformed depth map.

18. The computer-program product of claim 16, wherein the erroneous depth information comprises depth sensor outages.

* * * * *